Oct. 17, 1939.  H. NEUEITER ET AL  2,176,146
BOOKKEEPING MACHINE
Filed June 8, 1934    15 Sheets-Sheet 1
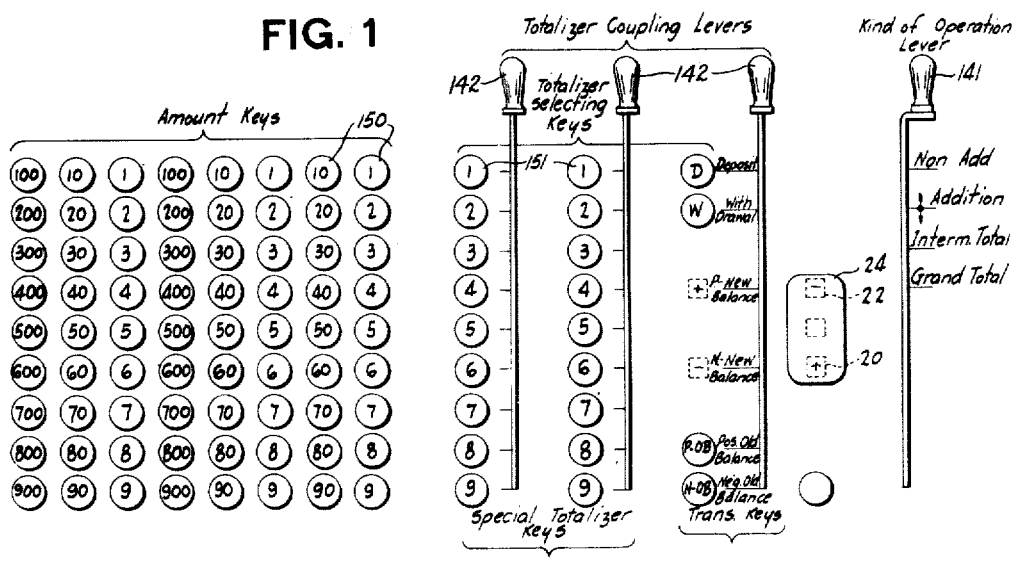
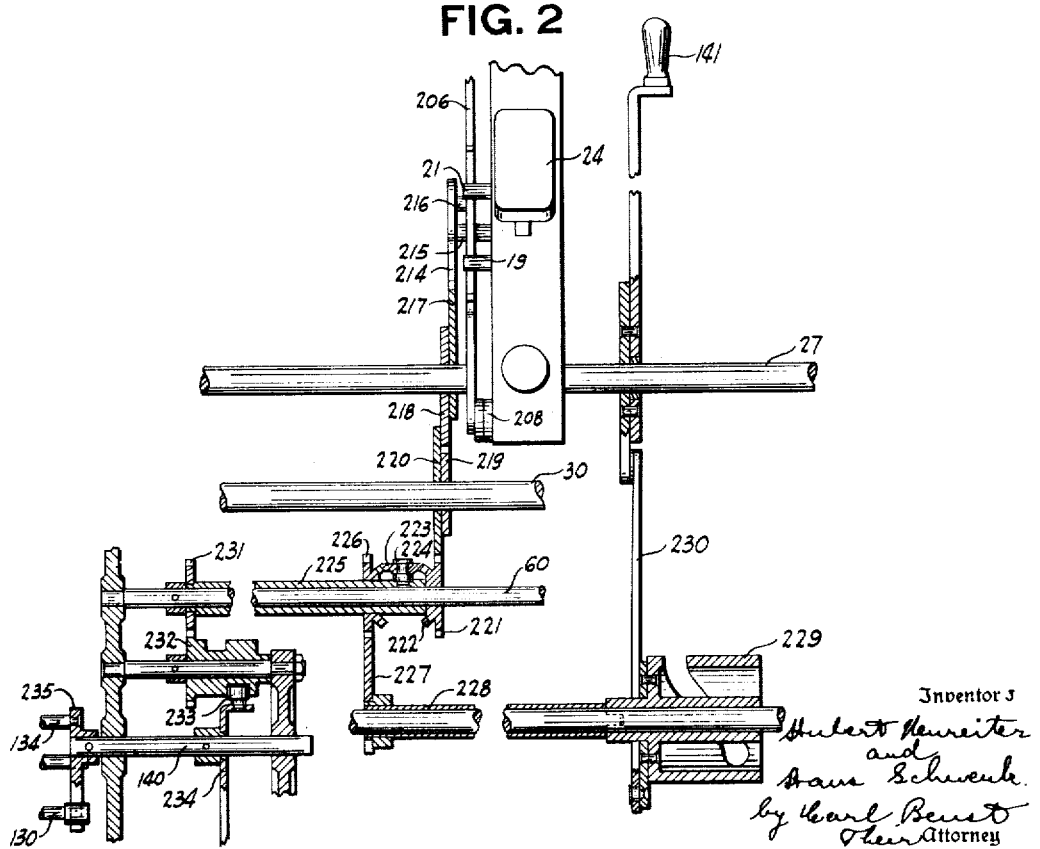

Oct. 17, 1939.  H. NEUEITER ET AL  2,176,146
BOOKKEEPING MACHINE
Filed June 8, 1934   15 Sheets-Sheet 3

Inventors
Hubert Neueiter
and
Hans Schwenke
by Carl Bunst
Their Attorney

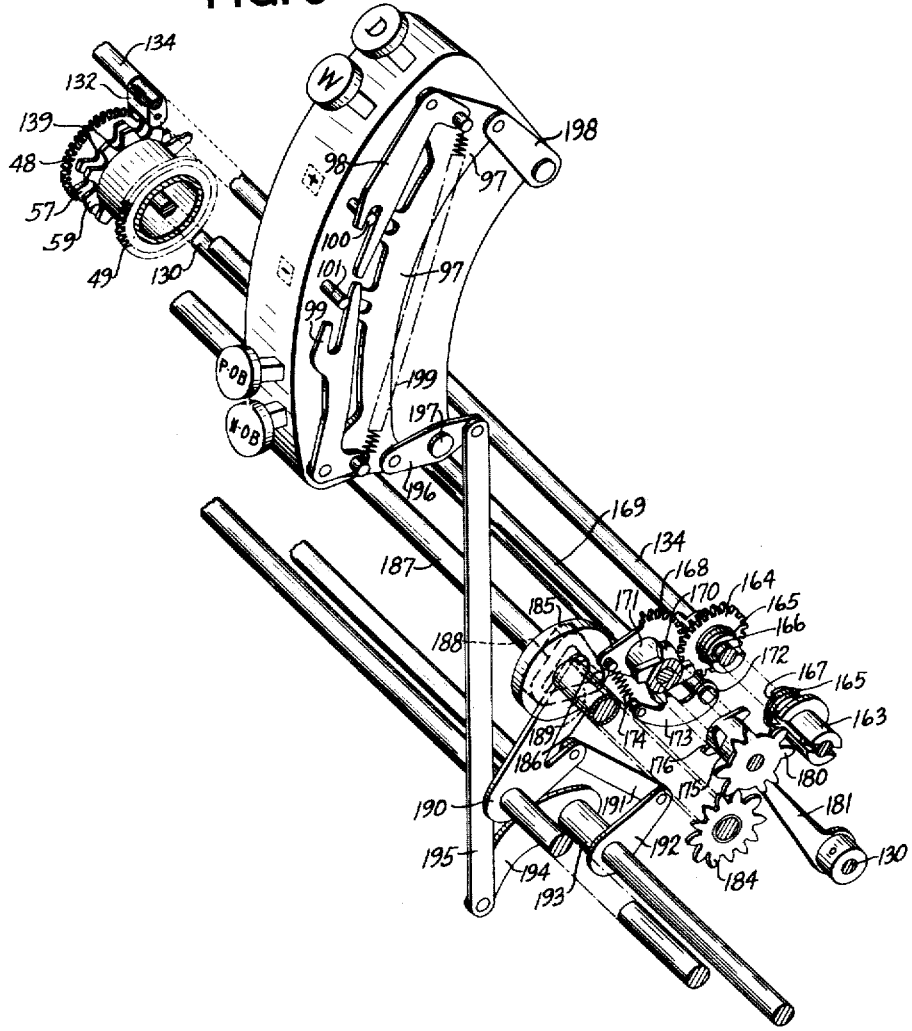

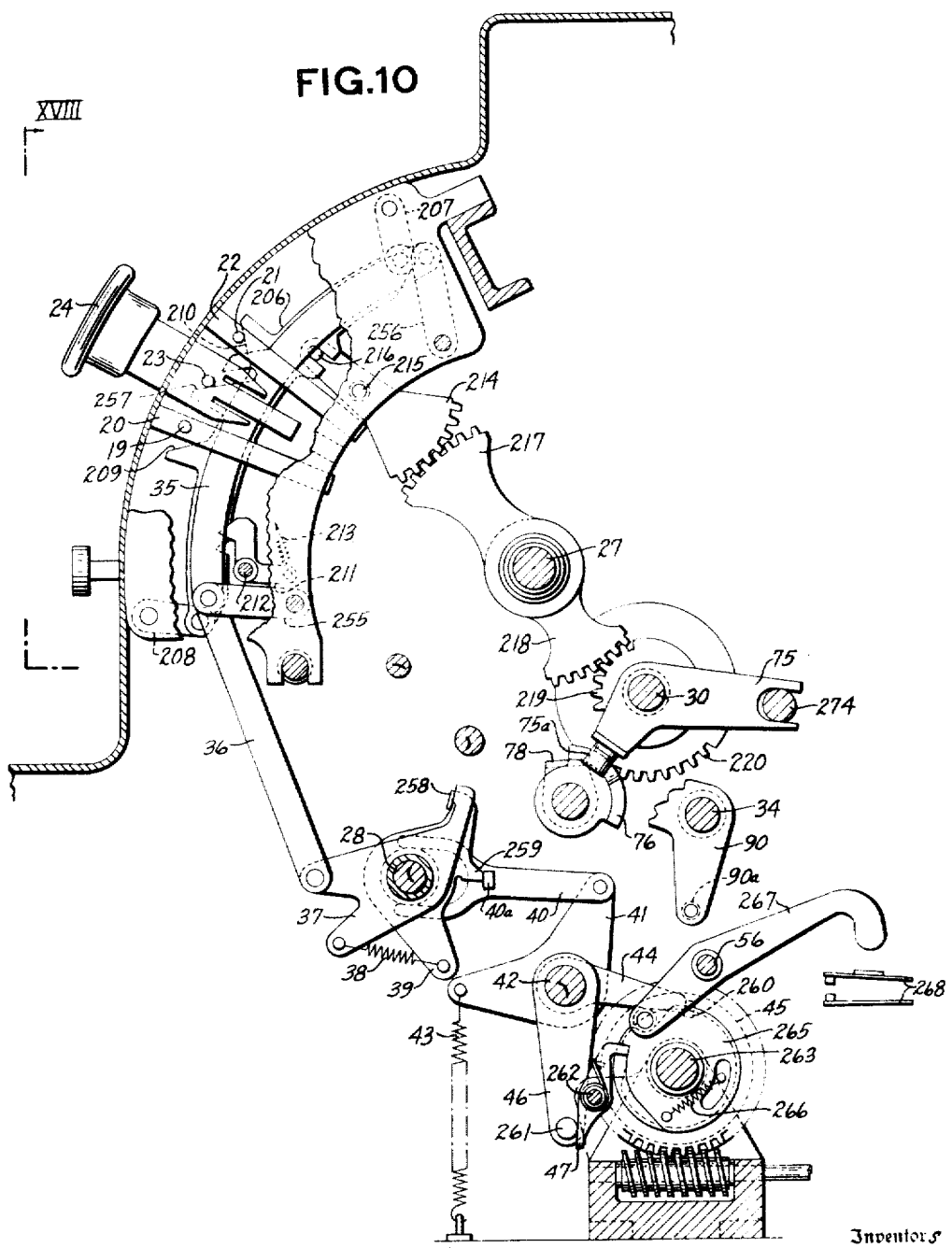

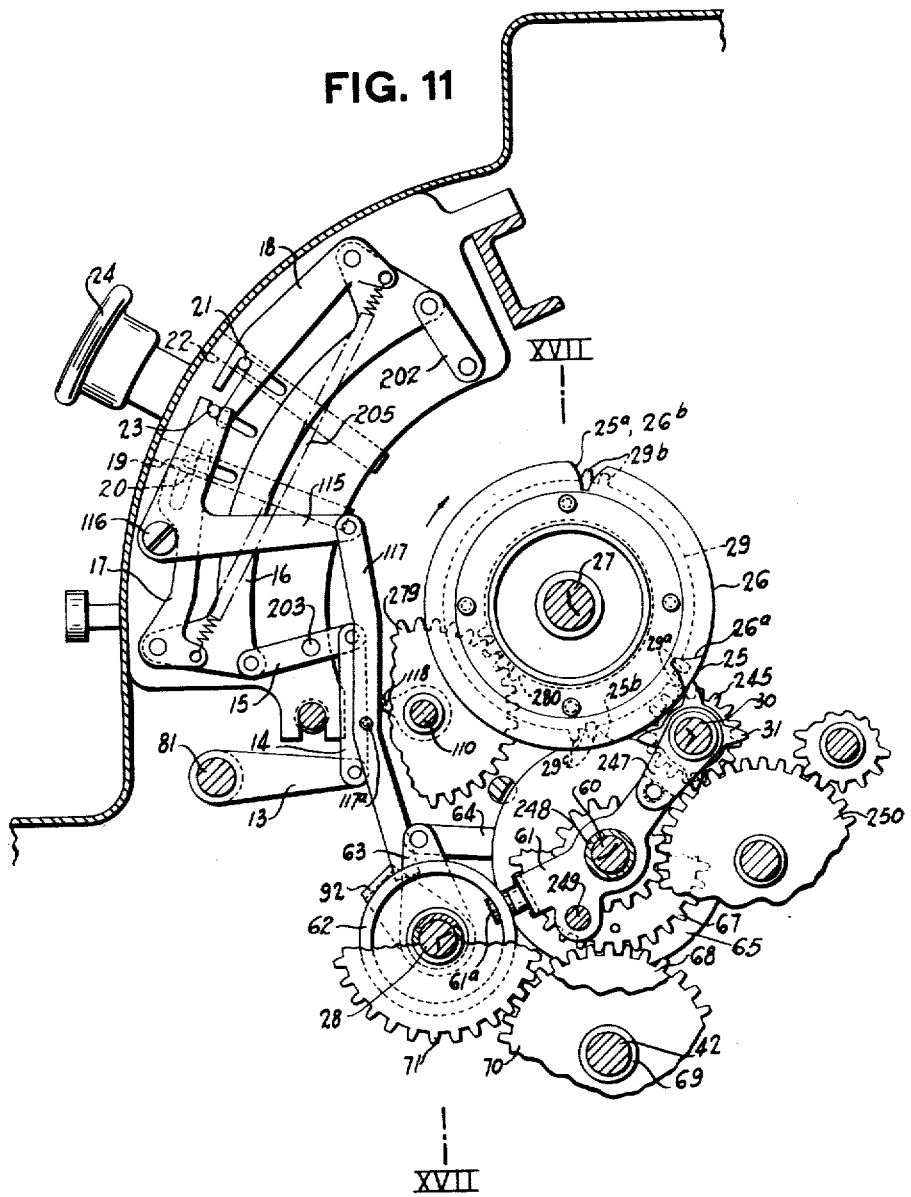

Oct. 17, 1939. H. NEUEITER ET AL 2,176,146
BOOKKEEPING MACHINE
Filed June 8, 1934 15 Sheets-Sheet 8

Inventors
Hubert Neureiter
and
Hans Schwenk
by Carl Berndt
Their Attorney

Oct. 17, 1939. H. NEUEITER ET AL 2,176,146
BOOKKEEPING MACHINE
Filed June 8, 1934 15 Sheets-Sheet 10

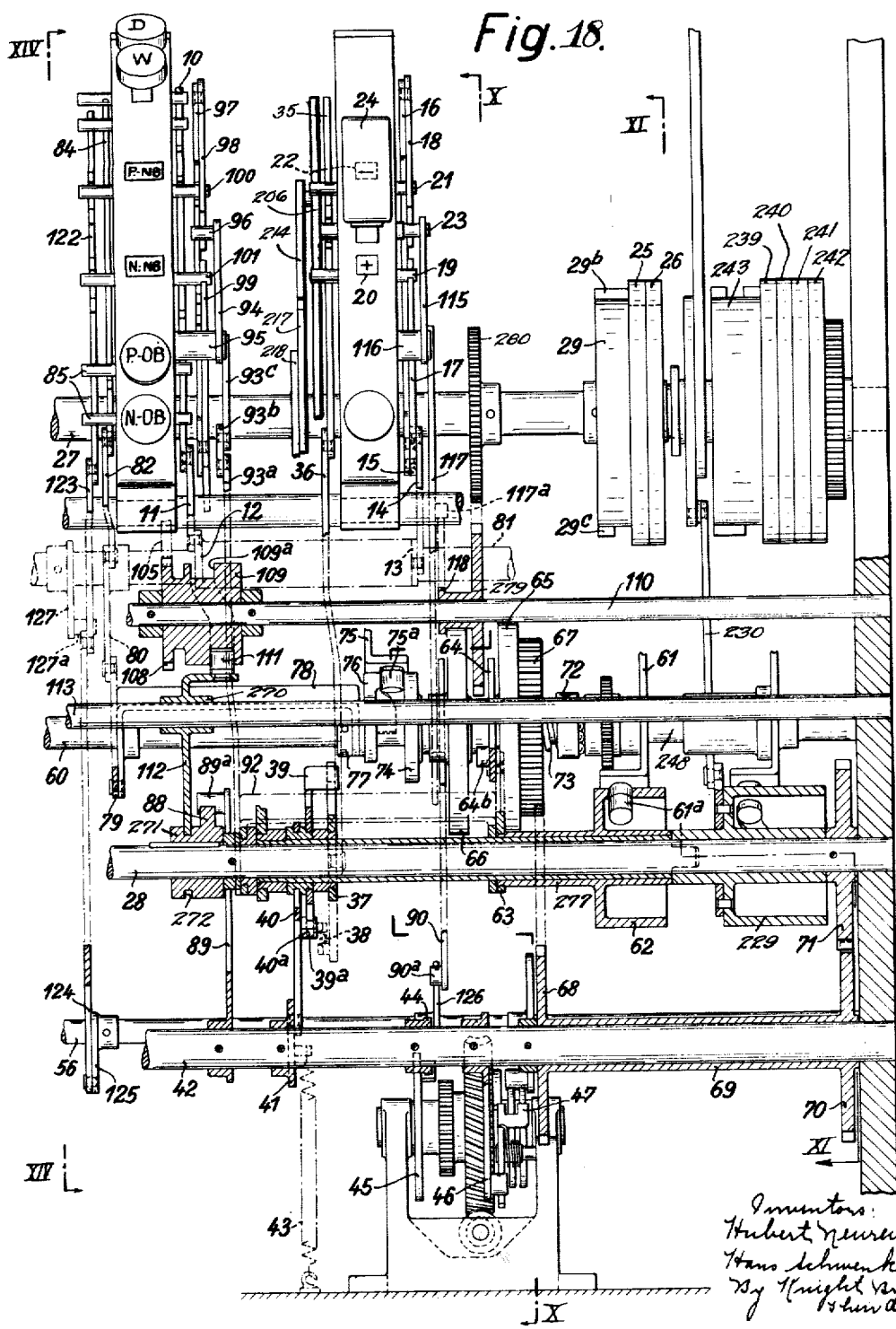

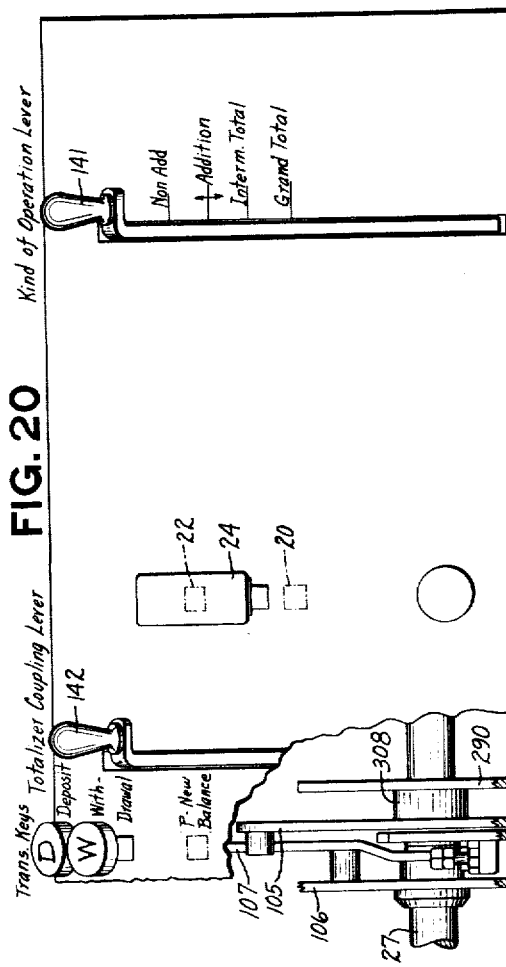
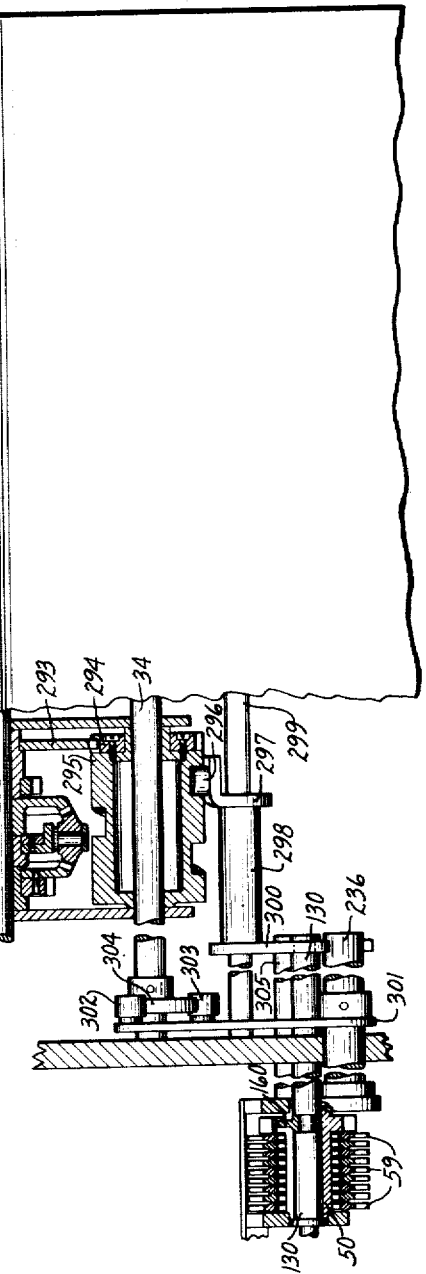
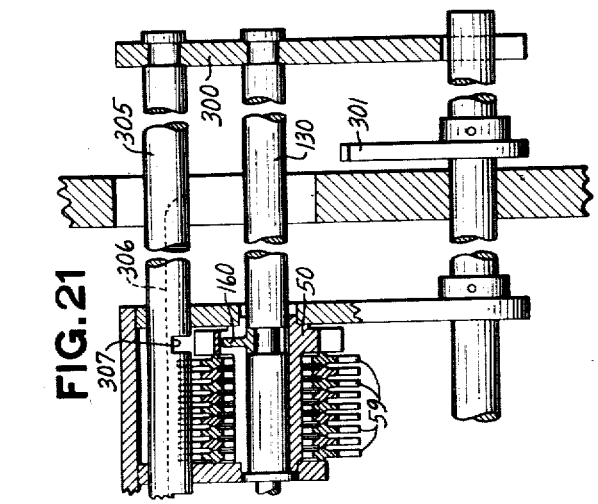

Patented Oct. 17, 1939

2,176,146

UNITED STATES PATENT OFFICE 2,176,146

BOOKKEEPING MACHINE

Hubert Neureiter and Hans Schwenk, Essen, Germany, assignors, by mesne assignments, to The National Cash Register Co., Dayton, Ohio, a corporation of Maryland Application June 8, 1934, Serial No. 729,712
In Germany June 14, 1933

11 Claims. (Cl. 235—7)

The present invention relates to bookkeeping and accounting machines, and is shown embodied in a machine used in banking houses for calculating and printing customers' accounts when one or more deposits or withdrawals are made.

In the past it has been customary, when calculating such accounts, to enter the customer's old balance in the machine, and to add or subtract therefrom the deposits and withdrawls made. The new balance was then taken by a separate operation, to print the proper new balance on the customer's account card or pass book, and to clear the balance totalizer for the next account. This procedure necessitated one operation for the entry of the old balance, one operation for each deposit or withdrawal, and a separate operation for taking the new balance. If it was further desired to accumulate these new balances for future reference, it was necessary to operate the machine through an additional adding cycle to reaccumulate such items. It will be noticed that such procedure requires, aside from the operations necessary for handling the deposits or withdrawals, either 2 or 3 separate operations, depending on whether it is desired to reaccumulate the new balances.

The present invention simplifies the operation of the machine in respect to these 2 or 3 particular operations to the extent that the operator is required to start the machine only once to perform all of them. With the structure herein shown the operator first enters the deposits and withdrawals on the balance totalizer, and then sets up the old balance and starts the machine. This old balance is added or subtracted as the case may be with the deposits and withdrawals, after which the machine automatically takes the new balance and prints it on the customer's account card or pass book, and reaccumulates this new balance in one of two separate totalizers according to whether such new balance is positive or negative.

With this and incidental objects in view, the invention includes certain novel features of construction and combinations of parts, the essential elements of which are set forth in appended claims and a preferred form or embodiment of which is hereinafter described with reference to the drawings which accompany and form a part of this specification.

In the drawings:

Fig. 1 is a diagrammatic view of the keyboard;

Fig. 2 is a front sectional view of the structure for shifting the balance totalizer for adding or subtracting;

Fig. 9 is a perspective view of the overdraft mechanism and its connection with balance totalizer and with the transaction key bank;

Figs. 10 and 11 are side views of the motor key bank, Fig. 10 showing its connection with the balance totalizer, and with the motor clutch for starting the machine, and Fig. 11 showing its connection with parts of the automatic cycle mechanism;

Figure 16:
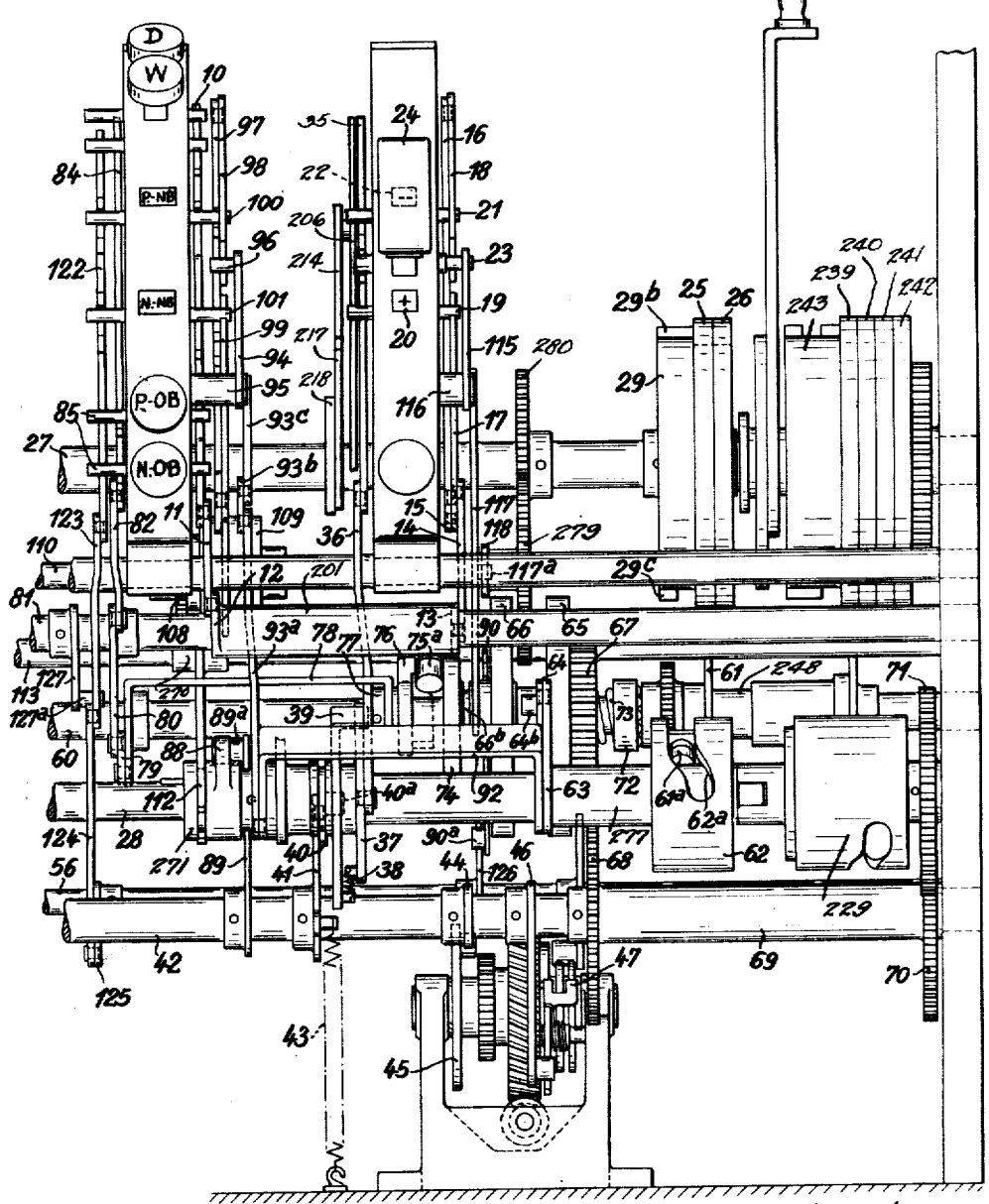
Figure 17:
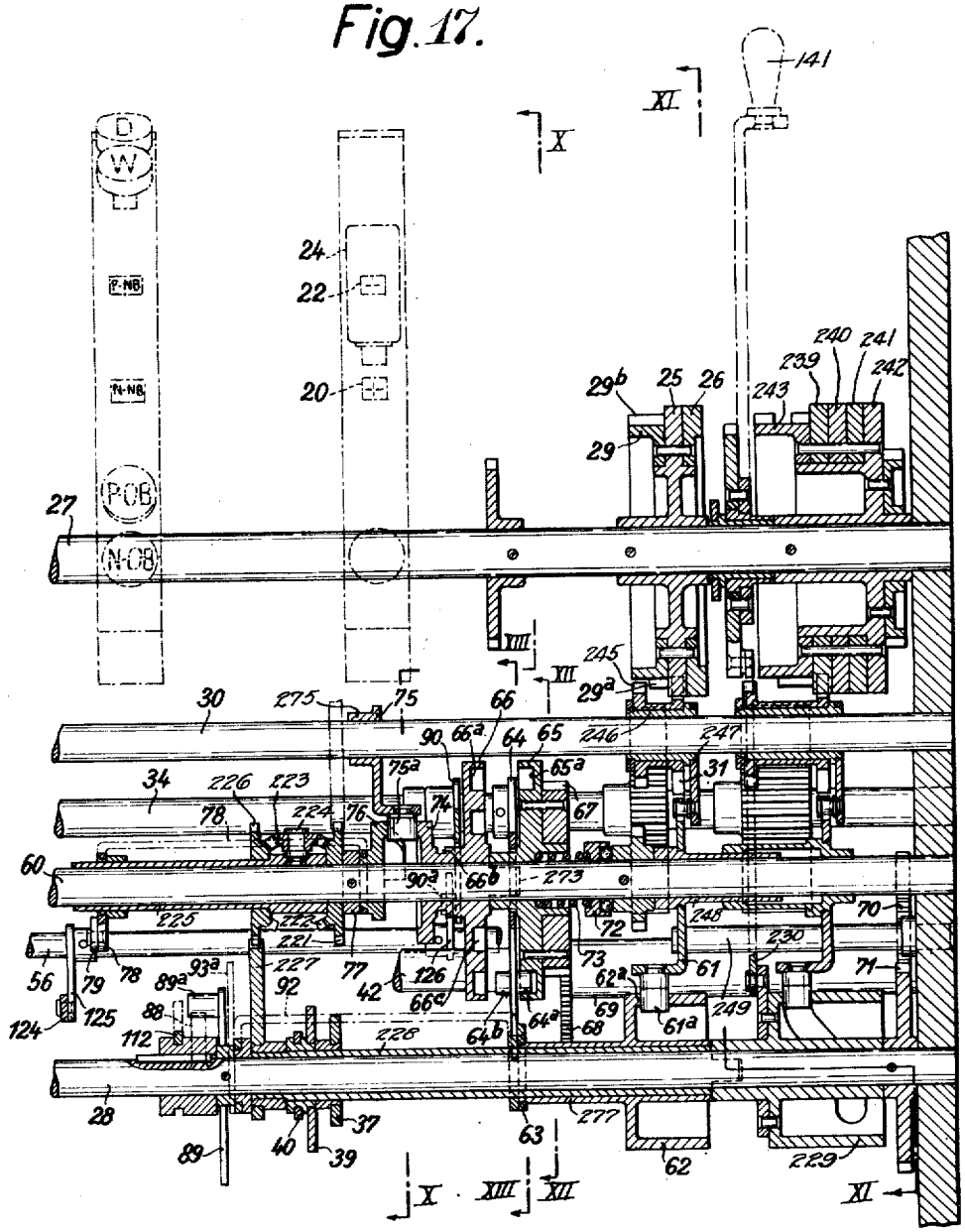
Figure 19A:
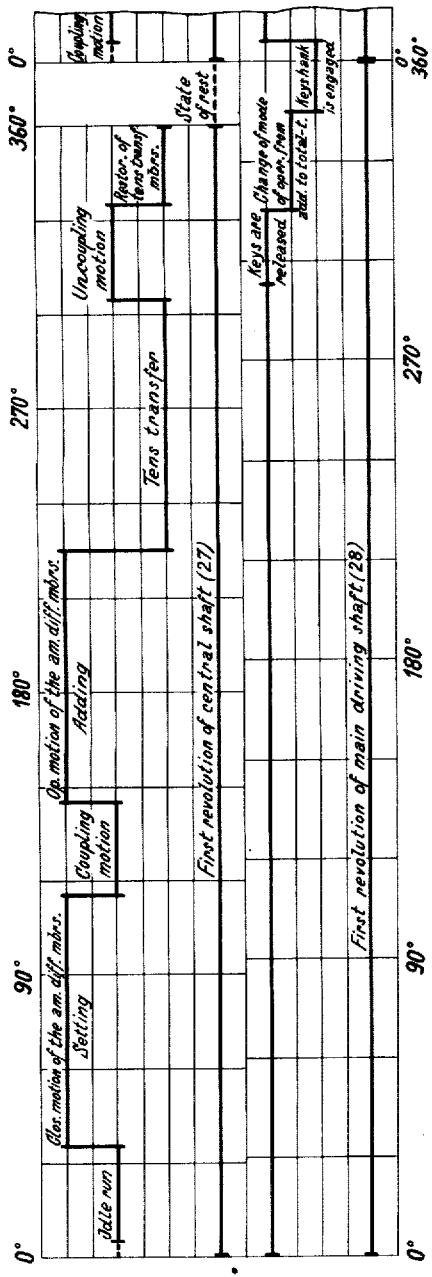
Figure 19B:
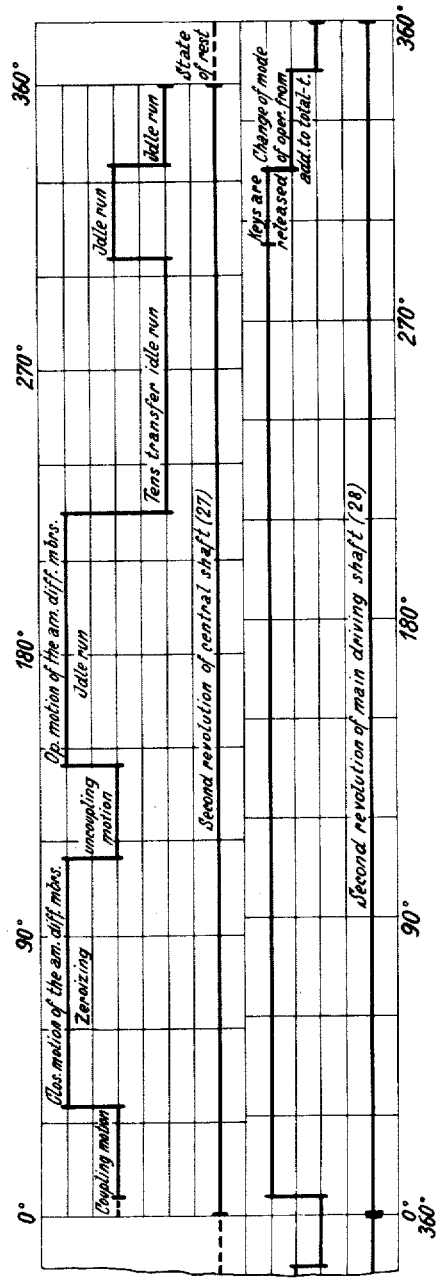

Figs. 16, 17 and 18 are front views, Figs. 17 and 18 showing many parts in section; and Figs. 19a and 19b show the timing of some of the main parts of the machine.

Fig. 20 is a front elevation with the cabinet broken away to show parts of the totalizer selecting mechanism.

Fig. 21 is a plan view of parts shown in Fig. 20.

GENERAL DESCRIPTION

The present mechanism discloses a machine having one adding and subtracting, or old balance totalizer of a customary type embodying reversely rotated wheels. There is also provided adding totalizers to accumulate separately the deposits, withdrawals, positive old balances, negative old balances, positive new balances, and negative new balances, and there is further provided two rows of special totalizers for additional classifications of any required nature.

When a deposit or withdrawal is to be made the proper transaction key D or W is depressed, and the machine operated by depression of the motor bar. This enters the amount on the proper side of the balance totalizer, and enters it in the special totalizer assigned to the transaction key depressed. The customer's old balance is next entered in the machine by depression of the proper one of the transaction keys P—OB or N—OB, according to the algebraic character of the old balance. Upon depression of the motor bar the machine enters the amount set up on the proper side of the balance totalizer and into the transaction totalizer for the particular transaction key depressed.

Depression of one of these old balance transaction keys also causes the positioning of certain parts in the machine to cause the taking of a new balance during an additional cycle automatically following the entry of the old balance. During the taking of the new balance the overdraft mechanism for the balance totalizer automatically causes the total taking mechanism to be aligned with the proper side of the balance totalizer, and causes the proper new balance transaction key to be depressed to accumulate this new balance in the proper new balance transaction totalizer.

At the end of this second cycle of operation the machine is automatically brought to rest with the parts in position for entering deposits and withdrawals for the next account.

Detailed Description

Keyboard

The keyboard for the present machine is shown diagrammatically in Fig. 1 and includes amount keys 150, two rows of special totalizer keys 151 and a row of transaction keys bearing appropriate legends. In this transaction bank the keys D and W represent deposits and withdrawals respectively, and the keys P—OB and N—OB represent positive old balances and negative old balances respectively. The two blind keys situated near the center of this bank represent the positive and negative new balances. A motor key 24 is situated to the right of the transaction bank and cooperates with two blind keys 20 and 22 used to shift the operating mechanism for the balance totalizer so that amounts may be entered thereon algebraically. A kind of operation lever 141 is provided to take the totals from the various totalizers in the transaction bank, and in the two banks of special totalizer keys. Three totalizer coupling levers 142 also are provided for use in taking totals in these banks. The function of these levers is to select a particular totalizer when it is desired that the total be taken therefrom. The present invention, however, is not involved with the details of the taking of totals from any of the totalizers in these three rows so that the operation of these levers is not given. The special totalizer keys 151 in the two left hand rows control only their respective totalizers, while the transaction keys in the right hand row control not only the respective totalizer assigned to each, but further control the operation of the balance totalizer.

It must be remembered that the kind of operation lever 141 is used in taking totals from the totalizers for the three rows of totalizer selecting keys, but is not used when a total (new balance) is taken from the balance totalizer, for such operations are performed with the lever 141 in its addition position.

Differential mechanism

Figure 3:
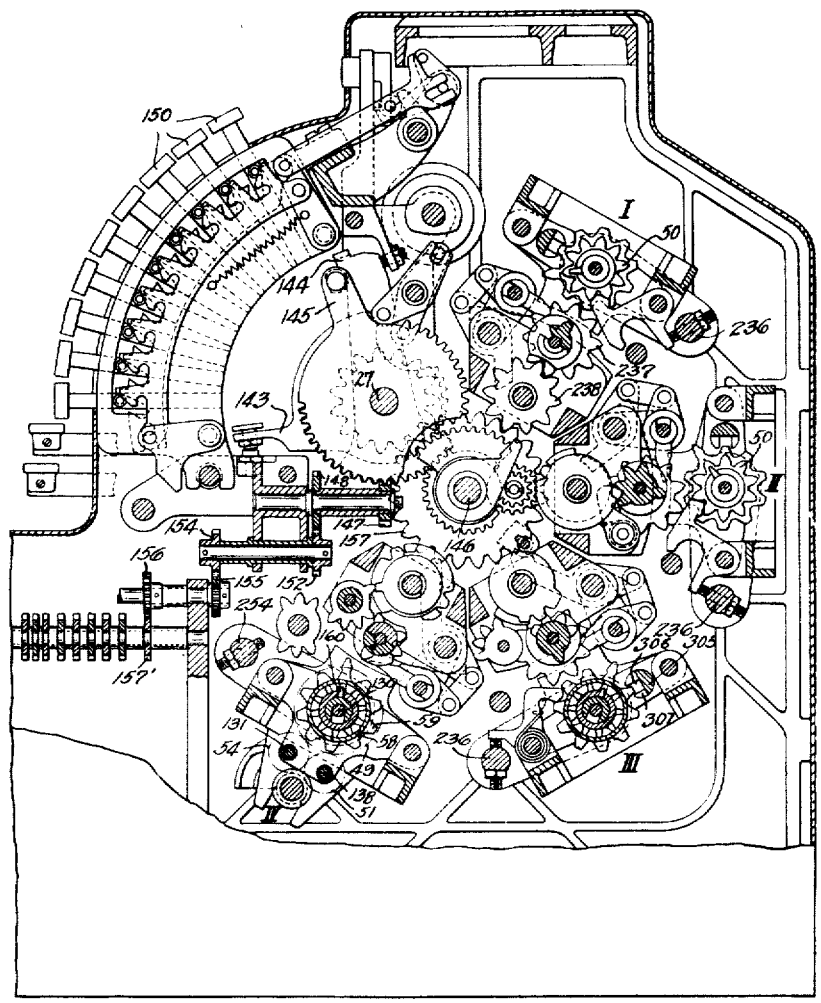
Fig. 3 is a side view showing the rows of totalizers and the amount differential mechanism.
Figure 14:
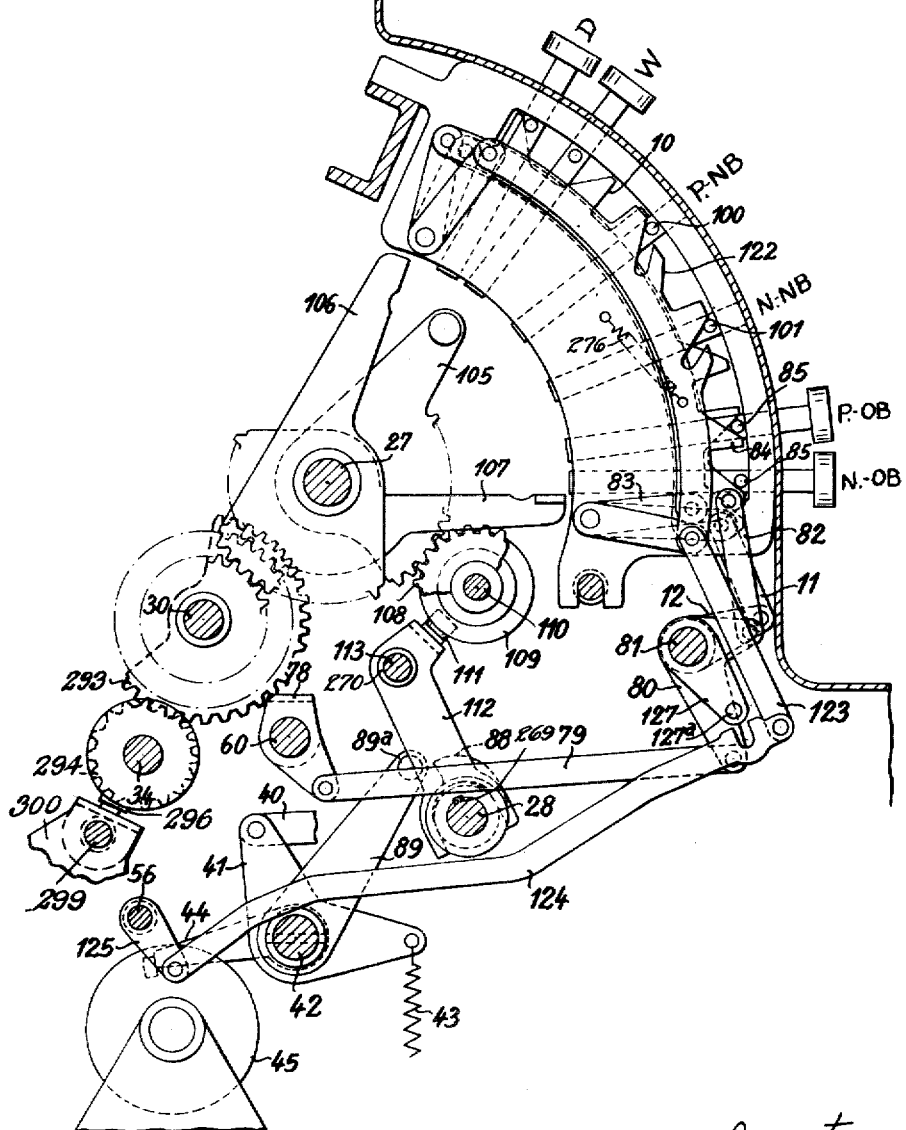
Fig. 14 is a side view of transaction key bank taken from the direction opposite to that of Fig. 12, and showing other connections between the keys of this bank and the automatic cycle mechanism.

The differential mechanism is shown in a general way in Figs. 3 and 14, Fig. 3 showing the amount differental, and Fig. 14 a few parts of the transaction differential. Referring to Fig. 3, the differential includes two complementarily movable arms 143 and 144 brought together through the action of planetary gears to adjust a minimum movement segment 145 under the inner end of a depressed amount key 150. These parts are actuated by a suitable pinion secured to a shaft 146 oscillated during each operation of the machine. The detailed movement of these parts is not given since they are fully shown and described in the U. S. Patent No. 1,792,569 issued to Ernst Breitling on February 17, 1931. It might be noted, however, that the particular form of planet gearing shown in Fig. 3 is not present in the patent, but is shown in a later patent disclosing the mechanism for taking totals in this type of machine. This later patent is numbered 1,899,455, issued to Ernst Breitling on February 28, 1933. For an understanding of the present case it is sufficient to say that the movement of the complementarily movable members 143 and 144 causes a movement of a large gear 157 to an extent commensurate with the value of the depressed amount key 150. The positioning of the minimum movement segment 145 causes a positioning of its corresponding amount type wheel through a train of gears 147, 148, 152, 154, 155 and 156, and the rack 157; the gear 147 being driven by the segment 145, through beveled teeth appearing on both members.

The differential mechanism for the transaction banks is partially shown in Fig. 14, and includes complementarily movable members 106 and 107 and a minimum movement segment 105. As is customary in the art the differential mechanism for these banks controls the relative positioning of the various totalizers, and the actuating mechanism so that an amount set up on the keyboard will be entered in the appropriate totalizer under control of the totalizer selecting keys. However, since the details of this selecting mechanism are not necessary to an understanding of the present invention they are not shown.

Totalizers

The machine on which the present invention is shown includes three rows of interspersed totalizers (Fig. 3) situated radially about a central shaft 146. For identification these rows are numbered I, II and III. Each of these rows customarily contains nine totalizers. In the present instance two of the rows contain nine totalizers assigned to the two rows of special totalizer keys, and the third row contains six totalizers assigned to the transaction keys. The construction of these interspersed totalizer units and the operation thereof is generally well known in the art, and a form corresponding very closely to that used in the present mechanism is shown and described in U. S. Patent 1,896,936, issued to Bornkessel et. al. on February 7, 1933. The details of this mechanism, however, are not necessary to an understanding of the present invention so they are not shown.

There is also provided a balance totalizer consisting of only one totalizer unit but having two reversely rotating wheels in each decimal order. This totalizer unit is numbered IV in Fig. 3 and is better shown in Figs. 4, 5 and 8a and b. It includes two reversely actuated wheels 57 and 59 (Fig. 8a), a pair of which is provided for each decimal order. The operation of these wheels is briefly as follows:

The differential rotation of large gear 157 (Figs. 3 and 4), commensurate with the value of the numeral key depressed in that particular decimal order, is transmitted directly to pinion 158 (Fig. 4), and from there to pinion 159. Since, at the time of this operation pinion 50 is engaged with pinion 159, the motion will be transmitted to the former and to a sleeve 153 (Fig. 8a) secured to this pinion. A rider 160 is loosely mounted on shaft 130, and is slidable longitudinally of the sleeve 153 as clearly shown in this figure. The rider has an upwardly extending prong protruding through a longitudinal slot in the sleeve 153, and is adapted to be moved longitudinally into the plane of either of the totalizer wheels 57 or 59 by longitudinal movement of shaft 130. When the rider is so moved it is in a position (See Fig. 5) to rotate one of the totalizer wheels upon rotation of the pinion 50 and the sleeve 153.

The reverse rotation of wheels 57 and 59 is made possible by the gear 51 on the shaft 138 (Fig. 5), and gears 52 and 54 (Fig. 8a) connected by a sleeve 53. When a rotation is imparted to the wheel 59, the movement is transmitted through a sleeve 58 and a gear wheel 49 to the wheel 54, sleeve 53, gear 52 and then to gear 51. Rotation of the gear 51 causes rotation of a gear 48 attached to a sleeve 55 on which the totalizer wheel 57 is mounted. It will be noted that gear 51 is sufficiently broad as to mesh with gear 52 and also with gear 48.

Figure 5:
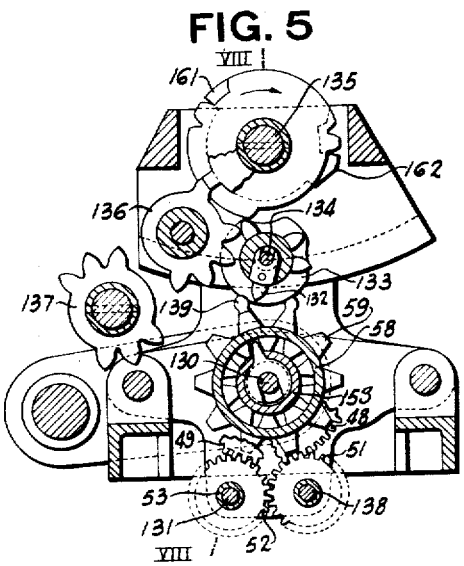
Figure 7:
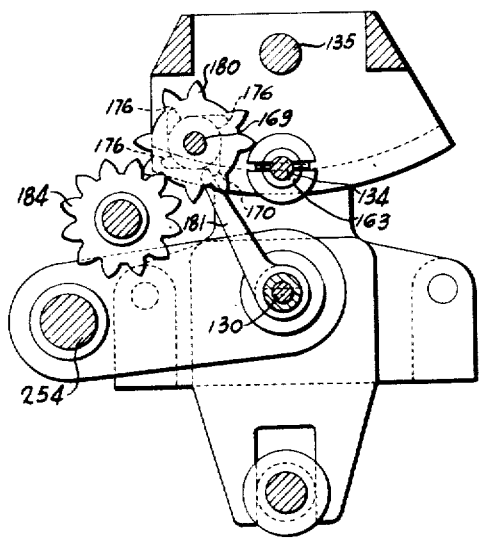
Figure 8A:
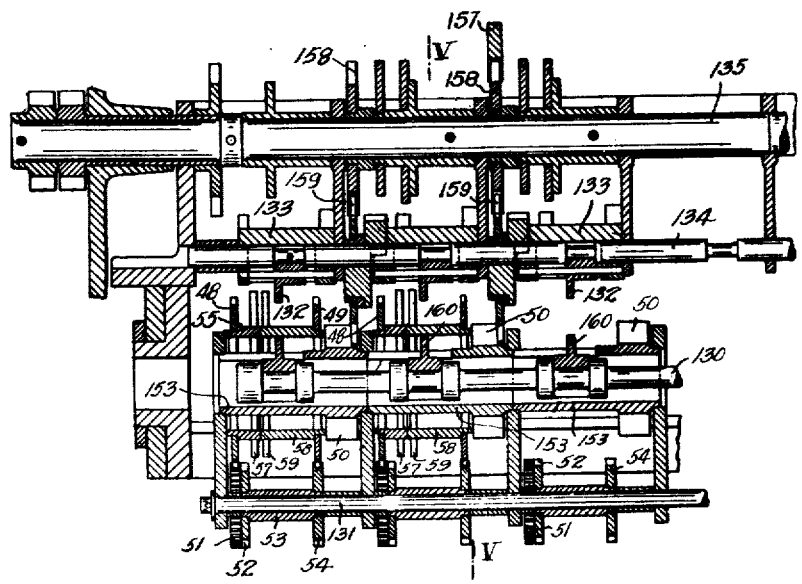
Figs. 8a and 8b are front sectional views of the balance totalizer and show the connection between this totalizer and the overdraft mechanism.

Each of the totalizer wheels 57 and 59 carries a tooth 139 (Fig. 5), sufficiently long as to strike a finger 132 depending from an assembly of parts 133 appearing directly over the totalizer wheels in Figs. 5 and 8a. The long tooth of an actuated totalizer wheel displaces its finger 132 whenever it is moved through zero. This movement of the fingers 132 is for the purpose of transferring units from one order to another, and is assisted in this action by disks 161 and 162, and the mutilated gears 136 and 137 appearing in Fig. 5. However, since the details of this mechanism are not necessary to an understanding of the present invention they are not given.

Figure 8B:
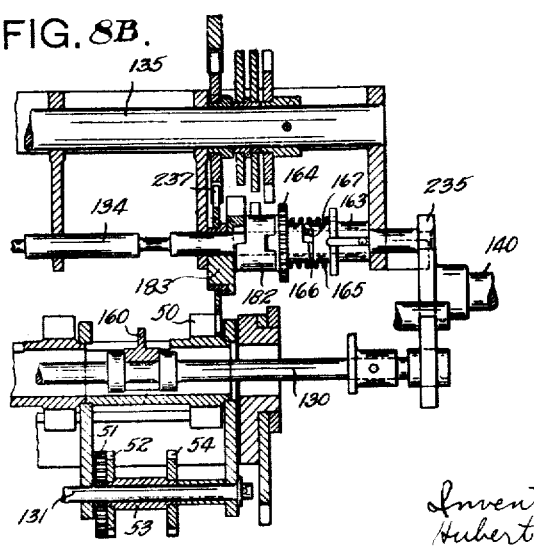

It will be noted, however, that the finger 132 (Fig. 8), cooperating with the totalizer wheels 57 and 59 of the highest decimal order, is pinned to the shaft 134 so as to impart a slight rotation thereto whenever the wheels of highest order pass through zero.

Overdraft mechanism.

The machine on which the present invention is shown includes a device commonly known as an automatic overdraft mechanism. This mechanism causes the totalizer to add a unit in the lowest decimal order whenever the totalizer wheel of highest order passes from zero to 9 or from 9 to zero to correct the inaccuracy appearing in totalizers of this type whenever they are carried through zero to a negative quantity or returned through zero to a positive quantity.

The mechanism also includes the additional feature of allowing this additional or fugitive unit to be added in the units order, only when an actual overdraft occurs, and not when the totalizer passes from 9 to zero by exceeding its capacity in a positive direction, or from 0 to 9 by its capacity in a negative direction.

This mechanism is illustrated in Figs. 6, 7, 8 and 9. Referring to Fig. 9, it is seen that whenever either of the totalizer wheels 57 or 59 in the highest decimal order passes through zero they strike the finger 132 pinned to the shaft 134, and impart to this shaft a counterclockwise rotation. A sleeve member 163 is situated on the right hand end of shaft 134, and is connected thereto by a pin and slot connection (see also Fig. 8b). This allows the shaft 134 to be shifted axially without a corresponding movement of the sleeve 163, but causes the sleeve to receive whatever rotation is imparted to the shaft. This sleeve is connected to a gear 164 by a spring 165, the spring being secured to both of these members, and sufficiently strong that a partial rotation of sleeve 163 will be imparted bodily to gear 164 if the latter is free to rotate. The gear 164 is loosely mounted on shaft 134, and has a shoulder 166 lying in the vertical plane of a shoulder 167 on the sleeve 163. As shown clearly in Figs. 6 and 8b, these two shoulders normally lie some distance apart. With this construction when the finger 132 (Fig. 9) is given a rotation by one of the totalizer wheels 57 or 59, a corresponding rotation is imparted to the sleeve 163, which, through spring 165, will rotate gear 164, if the same is not positively held against rotation. If it is so held the spring 165 will be tensioned and upon passage of the long tooth 139 out of the path of the finger 132, the shaft 134 will spring back to its original position, relieving the tension in the spring. A segment 168 (Figs. 6 and 9) is loosely mounted on a shaft 169 and carries a stud 172 having pivoted thereon a dog 173. A sleeve member 175 is also loosely mounted on shaft 169 and carries a four tooth restraining wheel 170, four radial teeth 176, and a mutilated gear 180. The four tooth restraining wheel 170 lies in the vertical plane of the dog 173, which dog is constantly held against the wheel by the tension of a spring 174 secured to the dog and to a projection on the left side of the segment. The four teeth 176 are disposed around the sleeve 175 equidistantly and lie in two different planes. As shown in Fig. 9, these teeth lie alternately in the two planes. An arm 181 is secured to shaft 130 (Figs. 7 and 9) and lies in the plane of two of the teeth 176, when the balance totalizer is set for addition, and in the plane of the other two teeth when the totalizer is set for subtraction. The operation of these parts is briefly as follows:

When an overdraft appears in the register the shaft 134 is rotated counter-clockwise causing a counter-clockwise rotation of gear 164 and a clockwise rotation of segment 168, as well as the wheel 170, teeth 176, and gear 180 through the operation of dog 173 by the gear 168. If the balance totalizer was in a positive condition at the beginning of this operation the arm 181 will be lying out of the plane of the tooth 176 situated closest to it at this time. Therefore the segment 168 will be free to rotate, upon rotation of the shaft 134. This causes a rotation of the sleeve 182 (Fig. 8b) as well as the transfer eccentric 183, to enter the fugitive unit in the lowest decimal order. The precise manner that this unit is entered is not necessary to an understanding of the present invention and will, therefore, not be described. Upon the return of shaft 134 to normal position, by parts of the transfer mechanism in the highest decimal order, the segment and dog 173 will return to their original position, the dog 173 ratcheting over one of the teeth 176 to allow the wheels 170 and 180 and the teeth 176 to remain in their moved positions. This places one of the teeth 176 of the other plane in a position to have its movement restricted by the arm 181 unless the arm and shaft 130 are moved to their opposite lateral positions for the next operation involving a passage of the highest wheel through zero.

During the normal operation of the machine, when the balance totalizer is in a positive condition and is overdrafted to a negative condition, the arm 181 will not prevent the entry of the fugitive unit. Likewise when the totalizer is in a negative condition and is returned through zero to its positive condition, the arm 181 will not prevent the entry of the fugitive unit, since the four teeth 176 are rotated 90° by each overdraft passage of the totalizer through zero. Thus, as long as the operation of the machine involves transactions causing the balance totalizer to pass through zero positively and negatively in alternate succession the arm 181 will have no restraining action at any time, the totalizer being positioned alternately in its adding and subtracting positions during these operations involving the overdraft. However, should the totalizer have its capacity exceeded in either direction, the arm 181 will be effective to restrain the entry of the fugitive unit by lying in the path of a tooth 176 and thereby causing gear 164 to be held against rotation until the long tooth 139 passes the finger 132 and the spring 165 rotates shaft 134 and finger 132 to normal position.

The operation of this overdraft mechanism is given only in a general way since a very similar structure is fully shown and described in the above mentioned patent to Bornkessel et. al. See particularly Figures 16 to 21 of this patent.

Overdraft control of totalizer selection

Fig. 9 also discloses mechanism for causing the overdraft mechanism to automatically select either of two totalizer selecting keys for depression. The mechanism operates in such a manner that whenever the totalizer is in a positive condition one of the two totalizer selecting keys is selected, and whenever the totalizer is in a negative condition the other totalizer selecting key is selected. In the present instance the keys selected are the blind positive and negative new balance keys situated in the transaction bank and used to select either of the two new balance totalizers for separately accumulating positive and negative new balances.

As above described whenever the balance totalizer passes from positive to negative or vice versa, the gear 180 receives a 90° rotation. By means of the mutilated construction of this wheel 180 (Figs. 7 and 9), a 90° rotation thereof will cause a 60° rotation of a wheel 184 and a disk 185 connected thereto by a sleeve 186, the parts 184 to 186 being loosely journaled on shaft 187. A triangular cam groove 188 is cut in the disk 185, and is so situated that it moves a roller 189 in one direction or the other during each 60° rotation. These movements of the roller 189, it will be observed, are alternate, so that each time the gear 184 is given a movement, the roller 189 will be moved in a direction opposite to its last movement. The roller 189 is situated on the upper end of a bell crank 190 connected by a link 191 to a lever 192, connected by a sleeve 193 to an arm 194 having pivoted thereto a vertical link 195. It is now obvious that 60° rotations of gear 184 will move link 195 upward or downward depending upon its previous movement. The link 195 is connected to a lever 196 (see also Fig. 12) pivoted on stud 197 and connected to a detent slide 97. The lever 196, together with an arm 198 support the detent slide 97 for movement in the key bank. Two slotted levers 98 and 99 are pivoted to the slide 97 and are tensioned for outward movement by a spring 199 connected to each. These levers 98 and 99 have slots adapted to embrace studs 100 and 101 on the blind new balance keys, and are restrained in their outward movement by the studs 100 and 101. Each of the levers 98 and 99 has a long prong adapted to cooperate with a stud 96 (Fig. 12) on the upper arm of a bell crank 94 pivoted on the stud 95. Each lever also has a short prong adapted to contact studs 100 and 101 when the levers lie in a position where their long prongs cooperate with the stud 96. By this arrangement of parts it is evident that when the link 195 is in its upper position the detent 97 will lie in its lower position where the long prong on lever 98 will contact the stud 96, and the short prong will contact the stud 100 so that upon clockwise rotation of the bell crank 94 the blind positive new balance key will be depressed, and when the link 195 is moved to its lower position by the balance totalizer being overdrafted, the slide 97 will be raised to its upper position where the long prong on the lever 99 will contact the stud 96, and the short prong will contact the stud 101, so that upon clockwise movement of the bell crank 94 the blind negative new balance key will be depressed.

Totalizer selection for interspersed adding totalizers

The various interspersed totalizers situated in rows I, II, and III (Fig. 3) are selected for operation by the three rows of totalizer selecting keys shown in Fig. 1, as is customary in key set machines of this general character. The differential mechanism situated in these key banks (Figs. 14 and 20), shifts mechanism in the totalizer assemblies so that when the totalizer shafts are moved to engage the totalizers for actuation the desired totalizer in each row will be coupled with the actuating mechanism. The segment 105 that is differentially positioned under the end of a depressed totalizer selecting key corresponds to the segment 47 in the above mentioned Breitling Patent 1,792,569 and is connected by a short sleeve 308 to a segment 290 meshing with a pinion 291 secured to a short sleeve 292. A segment 293 also is secured to the sleeve 292 and meshes with a pinion 294 secured to a drum 295 rotatably mounted on shaft 34. As shown in Fig. 20, this drum carries a helical groove in its surface, in which rests a roller 296 mounted on a bent arm 297 secured to a plate 300 by a sleeve 298. As better shown in Fig. 21, the plate 300 embraces restricted portions in shafts 130 and 305 so that movement of the plate 300 to the right or left will impart a corresponding movement to these shafts. Shaft 130 is grooved to accommodate riders 160 that connect the actuating wheels 50 with the totalizer wheels 59, and shaft 305 carries a longitudinal groove 306 (see also Fig. 3) and notches 307, one for each decimal order, which constitute an aligning means so that only the totalizer wheel aligned with rider 160 will be free to rotate with the actuating wheel 50.

By the above mechanism, when the segment 105 is adjusted by operation of the differential mechanism, as fully described in the Breitling Patent 1,792,569, the segments 290 and 293 are correspondingly adjusted and rotate drum 295. Such rotation adjusts plate 30 bodily to the right or left, causing a corresponding adjustment of the shafts 130 and 305. In this manner the various totalizers are adjusted under control of the depressed totalizer selecting keys.

*Selection of the proper side of the balance totalizer for adding and for taking the new balance*

This mechanism is disclosed in Figs. 2, 10, 11, 14 and 15. As heretofore mentioned the six keys in the transaction bank control the selection of the positive and negative sides of the balance totalizer. This control is exercised through the provision of a detent slide 10 (Figs. 14 and 15) pivoted on two arms for movement in the key bank in the customary manner. This slide 10 has six cam portions, three of which cooperate with the deposit, positive new balance and positive old balance keys to select the positive side of the balance totalizer, and three cams cooperating with the withdrawal, negative new balance and negative old balance keys to select the subtracting side of the balance totalizer. The depression of any one of the first mentioned keys causes the slide 10 to be moved upward in the key bank, while depression of any one of the last mentioned keys causes the slide to be lowered. This raising or lowering causes a corresponding movement to be imparted to a link 11 pivoted to the slide 10 and to an arm 12 pivoted to the lower end of the link 11. This causes movement of a lever 13 connected to lever 12 by a sleeve 201, and movement of a link 14 connected to the lever 13, and further causes oscillation of a lever 15 connected to the link 14 and pivoted on a stud 203. Oscillation of the lever 15 causes an upward or downward movement of a slide 16 supported by the lever 15 and by an arm 202. Slide 16 has levers 17 and 18 pivoted thereon and pressed outwardly by the tension of a spring 205 connected to both. The levers 17 and 18 each have a long and a short prong, the long prongs being adapted to contact the under side of a stud 23 on the motor key 24, while the short prongs are adapted to contact studs 19 and 21 on blind keys 20 and 22 situated on either side of the motor key. It is apparent from an inspection of the drawings that when slide 16 is moved to its upward position by depression of one of the three keys for selecting the positive side of the balance totalizer, the short prong on the lower lever 17 wil engage the stud 19 on the lower blind key 20, and the long prong will engage the stud 23 on the motor key 24. Likewise when any one of the three keys for selecting the subtracting side of the totalizer is depressed the slide 16 will be lowered to the position shown in Fig. 11 and the upper lever 18 will contact the studs 21 and 23 for depressing the blind key 22.

A slide 206 (Figs. 10 and 15) is suspended on arms 207 and 208 for movement in the motor key bank. This slide 206 has two cams 209 and 210 situated under studs 19 and 21 on the blind keys in this bank. From an inspection of Fig. 10 it can be seen that when the blind key 20 is depressed stud 19 will engage cam 209 and lower the slide 206, whereas when blind key 22 is depressed, stud 21 strikes cam 210 and raises slide 206. A pawl 211 is pivoted at 212, and is held by a spring 213 in engagement with either of two notches in slide 206. This pawl is provided so that this slide 206 will be held in either of its positions until positively moved to the other position by depression of one of the blind keys. A segment 214 (Fig. 10) is pivoted at 215 to the key bank and carries a stud 216 lying within a slot in the slide 206. A segment 217 meshes with the segment 214 and is secured to another segment 218 lying adjacent thereto. Segment 218 meshes with a pinion 219 secured to a gear 220. By this train of connections movement of slide 206, causes a rotation of gear 220 and a pinion 221 (Fig. 2) meshed therewith and rotatable on shaft 60. Pinion 221 has bevel teeth 222 secured thereon and meshed with cooperating bevel teeth on a smaller pinion 223. This small pinion 223 is pivoted on a stud 224 secured to a sleeve 225 surrounding shaft 60. Another pinion 226 is loosely mounted on sleeve 225 and meshes with a segment 227 secured to a sleeve 228 having a tongue connection with a drum 229. The drum 229 is connected by a link 230 with the kind of operation lever 141 shown in Fig. 1. Since this lever 141 remains in its position shown during all the operations involved herein, the drum 229, sleeve 228, segment 227 and pinion 226 remain stationary at all times insofar as the description of the following operations are concerned.

Reverting now to the movement imparted to the pinion 221 by depression of one of the blind keys 20 or 22, it is seen that rotation of the pinion 221 causes rotation of the small pinion 223 and sleeve 225 in the same direction. This causes a corresponding rotation of a pinion 231 secured to the opposite end of the sleeve 225 and to a helical cam drum 232 having teeth meshing with pinion 231. Rotation of this drum 232 causes a roller 233 lying within its groove to be shifted laterally. This roller is connected to an arm 234 secured to shaft 140, so that rotation of the drum 232 by movement of the above described parts shifts the shaft 140 laterally. Shaft 140 is secured to a frame plate 235 carrying shafts 130 and 134, the lateral movement of which selects the adding or subtracting side of the balance totalizer, as clearly shown in Figs. 8a and 8b. From the above it is seen that a depression of the deposit, positive new balance or positive old balance keys followed by depression of the motor key causes the balance totalizer to be conditioned for adding, whereas a depression of the withdrawal, negative new balance or negative old balance keys followed by depression of the motor bar causes the balance totalizer to be conditioned for subtracting.

*Engaging and disengaging of the interspersed adding totalizers*

The means to engage and disengage the three rows of adding interspersed totalizers shown in Fig. 3 involves mechanism to move the totalizer wheels toward the central shaft 146 by swinging the wheels about shafts 236 as a pivot. This mechanism includes a cam 304 (Fig. 20) secured to shaft 34 and cooperating with rollers 302 and 303 on an arm 301 secured to shaft 236. This shaft 236 is secured to the totalizer frame so that upon rotation of cam 304, the arm 301 and totalizer frame will oscillate about shaft 236 as a pivot. A side view of these parts is substantially the same as the showing of parts 251 to 254 in Fig. 4. This oscillation of the totalizer frame causes the actuating gears 50 (Figs. 3 and 8a) to be engaged with intermediate gears 237 that are rotated differentially, through gears 238, by the large differential gear 157 under control of a depressed amount key. During adding operations the totalizers are engaged for actuation just before the differential mechanism returns home from its moved position, and are disengaged at the end of such return movement, while for total taking, a selected totalizer line is engaged at the beginning of a machine operation and is disengaged after the differentials have been actuated to their moved positions. For subtotalizing, the totalizers are engaged at the beginning of the operation and are left engaged until near the end of the operation, as is customary, and for non-adding operations they remain disengaged during the entire operation. The mechanism for controlling the timing of these four different types of operations includes four disks 239, 240, 241 and 242 and a drum 243 (Figs. 16 and 17). A Geneva gearing also shown in Fig. 17, but not numbered, cooperates with these disks and drum, and with a wide gear, to oscillate the shafts 236 (Fig. 3) to engage and disengage the totalizers in rows 1, 2 and 3 at the proper time. The shifting of the Geneva gearing to cooperate with these disks and the drum is accomplished by movement of the kind of operation lever 141 that rotates the drum 229 as above described, and as clearly shown in Fig. 2. However, since the details of the timing mechanism for the interspersed adding totalizers are not necessary to an understanding of the present invention they are not shown. It might be mentioned, however, that movement of the kind of operation lever 141 (Fig. 2) to one of its totaling positions rotates the pinion 226 through the operation of segment 227, sleeve 228 and drum 229, to rotate the small pinion 223, sleeve 225, pinion 231 and drum 232 to slide shaft 140 longitudinally to such an extent that the actuating riders 160 (Fig. 8) for the balance totalizer are moved out of engagement with the adding and subtracting wheels 57 and 59. This prevents the balance totalizer from taking part in any operation involving the taking of totals from any of the interspersed totalizers in rows 1, 2 and 3.

*Engaging and disengaging mechanism for balance totalizer*

The engaging and disengaging mechanism for the balance totalizer includes the disks 25 and 26 and the drum 29 (Figs. 11, 15 and 17) that cause the balance totalizer to be engaged with the actuators during their return motion for adding, and during their intial motion for total taking, or, as it is called in this case, the taking of the new balance. The disks 25 and 26 and the drum 29 are secured together and rotate as a unit on shaft 27 to which they are pinned. This shaft 27 receives one full revolution during each operation of the machine, the shaft, however, coming to rest a short time before the machine finishes its operation (Fig. 19a). This shaft is rotated by the main drive shaft 28 through a convenient form of Geneva gearing. However, since the details of such gearing are not necessary to an understanding of the present invention, they are not shown.

Cooperating with the disks 25 and 26 is a Geneva pinion 31 (Fig. 11) having four teeth and being connected to a pinion 245 by a short sleeve (Fig. 17). The pinions 31 and 245 rotate on a collared sleeve 246 slidable on shaft 30 and rigidly connected with a short arm 247 (Fig. 11). A frame piece 61 is secured to the arm 247 and is secured to a sleeve 248 slidable on the shaft 60. A stud 249 (Fig. 17) extends from the side frame of the machine into an aperture in the frame piece 61. A roller 61a secured to the lower end of the frame piece 61 extends in a helical slot (Fig. 16) in a rotatable drum 62 loose on shaft 28. From the above construction it is apparent that rotation of the drum 62 will cause a shifting of the frame piece 61 on the shaft 60, the frame piece being held against rotation about shaft 60 by the stud 249. This shifting of the frame piece causes a corresponding shifting of the arm 247, sleeve 246, pinion 245 and Geneva wheel 31, so that these latter two parts will selectively cooperate with the disks 25 and 26, and with different portions of the drum 29. When the parts are in the position shown in Fig. 17 the Geneva wheel 31 will cooperate with disk 25, and pinion 245 will cooperate with teeth on the left side of drum 29. This is the position the parts assume when they are set for addition.

Referring now to Fig. 11, we find that with the parts in such a position teeth 29b at the top of drum 29 will rotate pinion 245 90° to engage the balance totalizer after the differentials have been shifted to their moved positions. Near the end of the operation teeth 29c, appearing at the bottom of the drum 29 in Fig. 11 will rotate pinion 245 90° to disengage the totalizer after the differentials have completed their return movement. During these rotations of pinion 245, the openings 25a and 25b in the disk 25 each receive one of the teeth of the Geneva wheel 31 in order to permit the rotation of wheel 245. These teeth 31 of course prevent movement of wheel 245 at any other time by reason of their locking relation with the unbroken portions of disk 26.

Figure 4:
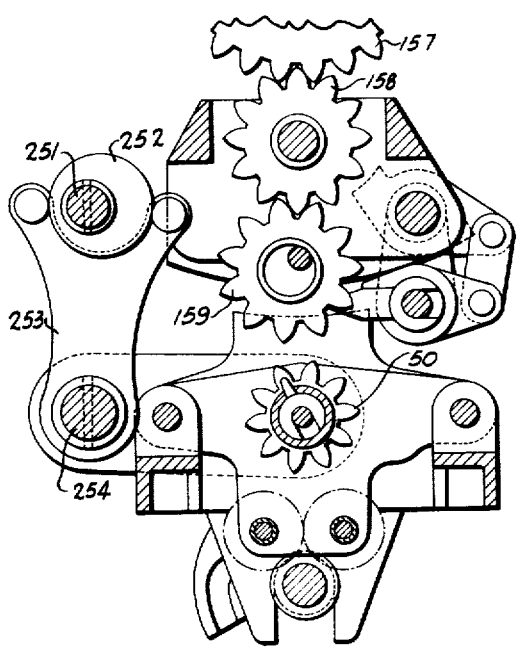
Figs. 4 and 5 are side sectional views of the balance totalizer, Fig. 4 showing its connection with the differential mechanism and Fig. 5 showing parts of the transfer mechanism.
Figure 6:
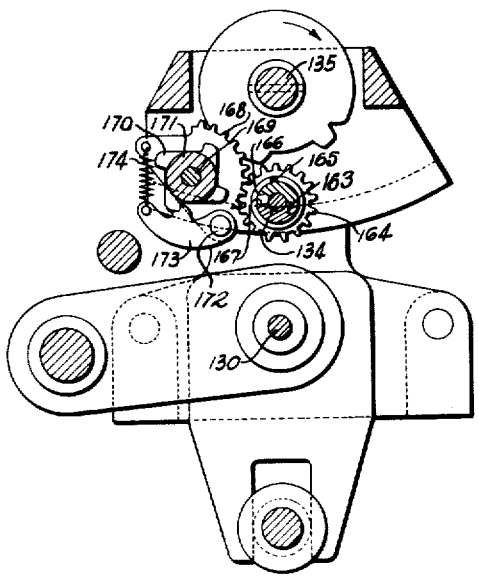
Figs. 6 and 7 are side sectional views of the balance totalizer showing parts of the overdraft mechanism.

When it is desired to take the new balance from the balance totalizer the drum 62 is shifted, by mechanism to be later described, so that the Geneva wheel 31 and wheel 245 will lie opposite the disk 226 and the right hand side of drum 29, respectively. With the parts in this position, teeth 29a (Figs. 11 and 17), rotate pinion 245 at the beginning of the operation of the machine so that the balance totalizer will be engaged with the actuators during their initial movement. After the actuators have finished their initial movement teeth 29b impart another 90° rotation to gear 245 to disengage the totalizer. During these movements of wheel 245 the openings 26a and 26b (Fig. 11) accommodate teeth on the Geneva wheel 31 to permit rotation of the gear 245. In this instance also, the Geneva wheel receives no movement except as above specified, because of the locking relation between the teeth of the Geneva wheel and the unbroken portions of disk 26. A larger gear 250 partakes of the 90° rotations of gear 245 and conveys this motion by suitable gearing to the shaft 251 (Fig. 4). The connections between gear 245 and shaft 251 are such that a 90° rotation of gear 245 imparts a 180° rotation to the shaft 251, but since the details of this gearing are not necessary to an understanding of the present invention they are not shown. From Fig. 4 it is obvious that a 180° rotation of shaft 251 will rotate the eccentric 252 a corresponding amount and thereby oscillate arm 253 secured to shaft 254 of the balance totalizer. Oscillation of this shaft engages the actuating gears 50 of the balance totalizer with the actuating pinions 159 in the same manner as above explained in connection with the shafts 236 (Fig. 3) for the interspersed adding totalizers.

*Machine release mechanism*

Figure 15:
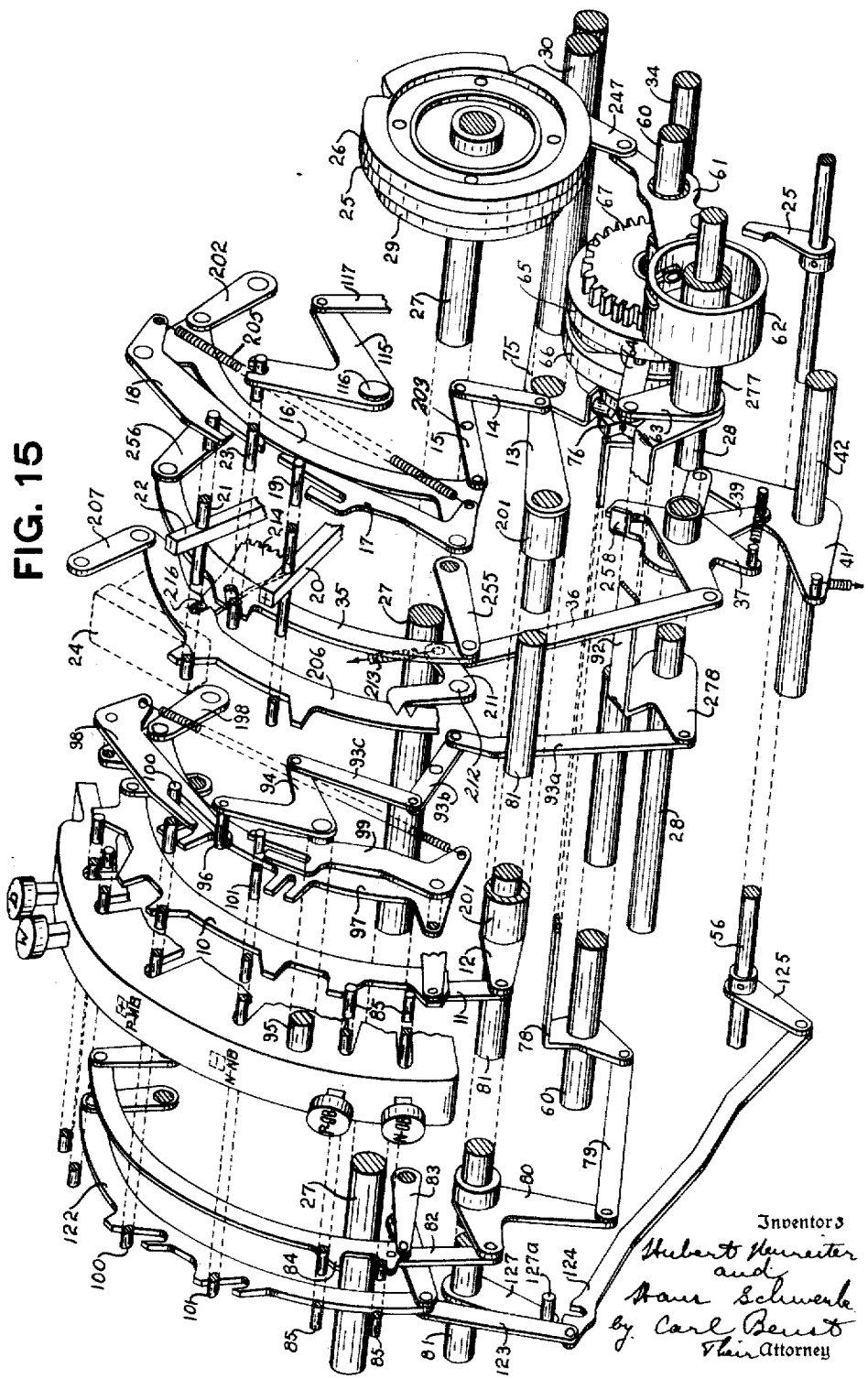
Fig. 15 is a perspective view showing the transaction and motor key banks together with many of the connections between these keys and the interior parts of the machine.

The mechanism for releasing the machine for operation is shown in Figs. 10 and 15. It is controlled by depression of the motor key 24 and causes the closing of an electric switch to start an electric motor. It also engages a clutch to couple the machine drive with the motor shaft.

A detent slide 35 is supported in the motor key bank on two arms 255 and 256 and has a cam 257 lying under the stud 23 on the motor key. Depression of the motor key thereby moves the slide 35 and the link 36 downward, and rotates a lever 37 loose on shaft 28 counter-clockwise. Another lever 39 is loose on shaft 28 and carries a flange 258 on the upper arm thereof lying in the plane of the upper arm of lever 37. The lower arms of levers 37 and 39 are pulled toward each other by a spring 38. A shoulder 259 on lever 39 lies in the plane of a block 40a secured to a pitman 40 having one end forked to straddle shaft 28 and pivoted at its other end to a lever 41 secured to release shaft 42. Shaft 42 has also secured thereto an arm 44 extending rearwardly into the path of a block 260 secured to the side of clutch disk 45, and further has secured thereon a downwardly extending lever 46 with a stud 261 at the lower end thereof. A release pawl 47 is pivoted at 262 to a portion of the machine frame, and is spring pressed toward a clutch shaft 263 by the coil spring shown. By the parts just described the counter-clockwise movement of lever 37, resulting from depression of the motor bar, rotates lever 39 counter-clockwise and removes shoulder 259 from the path of block 40a. This leaves the lever 41 free to move the pitman 40 to the left through the tension of a spring 43 attached to the forward arm of lever 41, and causes a counter-clockwise rotation of the release shaft 42. This rotation of shaft 42 causes the arm 46 to move the pawl 47 out of the path of a disk 265, and moves lever 44 out of the path of block 260. Movement of the pawl 47 allows the disk 265 to rotate counter-clockwise under tension of a spring 266, and thereby rotate a switch closing lever 267 clockwise about its pivot 56. This movement of lever 267 is caused by a roller mounted on the forward end thereof cooperating with a cam surface on the upper part of disk 265, and serves to close the contacts 268 to start the motor. Removal of the lever 44 from the path of the block 260 leaves the machine free to operate. The operation of this clutch mechanism is given only in a general way since such mechanisms are well known in the art, and since the details thereof are not necessary to an understanding of the present invention.

*Key release mechanism*

Figure 12:
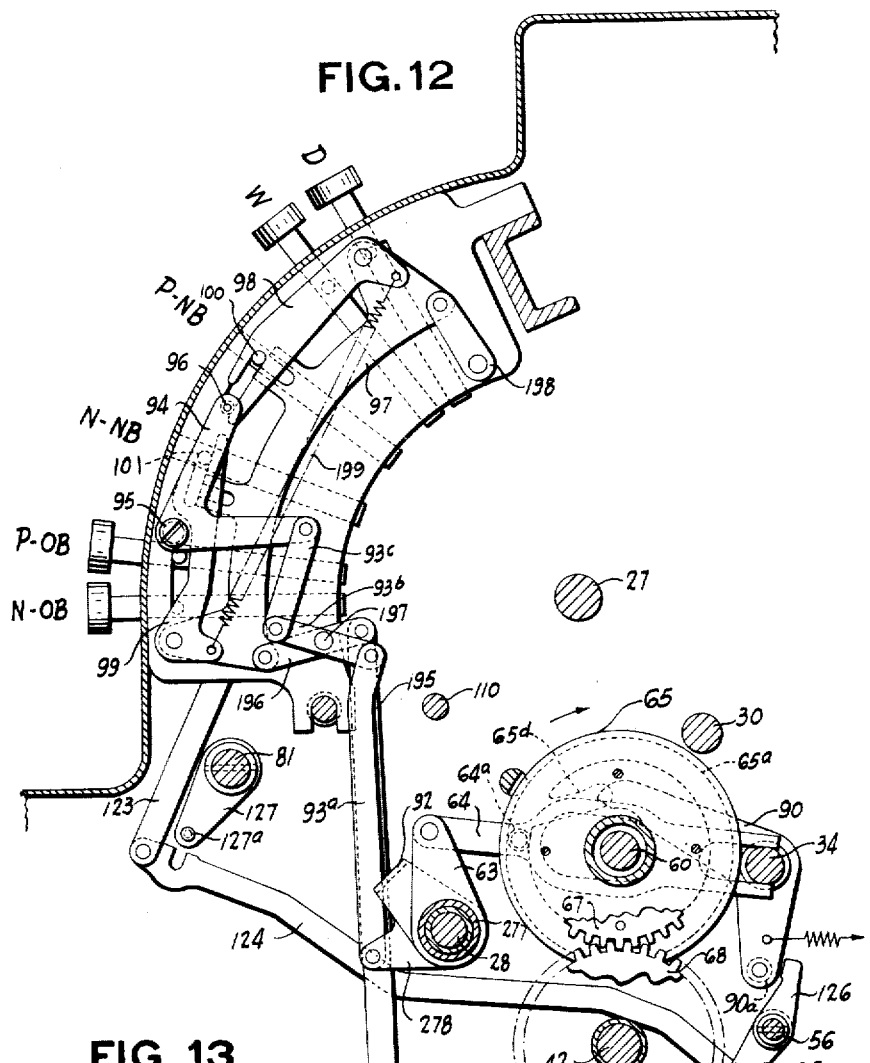
Fig. 12 is a side view of the transaction key bank showing some of its connections with the automatic cycle mechanism and its connection with the overdraft mechanism.

The mechanism to release the depressed keys during an operation is operated near the end of a machine cycle (Figs. 19a and 19b) and is operated by an oscillation of shaft 81 counter-clockwise, as viewed in Fig. 12. The detailed operation of this key release shaft and the manner in which it releases the keys, however, is not shown, since such mechanism are well known in the art and since the details thereof are not necessary to an understanding of the present invention.

*Restoring mechanism for machine release*

When the machine completes a cycle of operation it is necessary that the release shaft 42 (Fig. 10) be returned to the position shown in this figure so that the motor switch will be opened and the machine brought to rest. The parts for returning this shaft to its normal position are shown in Figs. 14, 16 and 17 and include a cam 88 (Fig. 14) lying normally in the plane of a roller 89a mounted on the upper end of an arm 89 secured to the release shaft 42. The cam 88 is mounted on shaft 28 which it will be remembered was described as the main operating shaft of the machine. The cam is held against rotation on shaft 88 by a spline 269, so that during normal operations of the machine the cam 88 will cause the arm 89 to rotate shaft 42 and carry with it lever 41 and pitman 40. This movement of pitman 40 to the rear removes the block 40a (Fig. 10) from under the shoulder 259 and thereby allows the levers 37 and 39 to return to their normal position shown in Fig. 10. This movement of shaft 42 also lowers arm 44 (Fig. 10) into the path of block 260, and moves arm 46 away from pawl 47 to allow the same to engage disk 265. Upon completion of the rotation of disk 265 the motor switch is disengaged and the machine brought to rest.

*Automatic cycle mechanism for taking a new balance*

As heretofore mentioned the invention includes a mechanism to automatically cause the machine to take a new balance immediately after an old balance is introduced in the machine, and to transfer this new balance into one of two new balance totalizers according to its positive or negative character. The introduction of the old balance is accomplished by depression of the appropriate amount keys together with either the P—OB or N—OB key, depending upon the positive or negative character of the old balance, and a depression of the motor bar. The resulting operation causes the old balance to be entered on the balance totalizer during the first cycle thereof. The depression of one of these two keys, as will appear later, causes mechanism to be set so that upon the completion of this one cycle the machine automatically continues for a second cycle, during which the new balance is taken from the balance totalizer and entered into one of the two new balance totalizers in the transaction bank.

To accomplish this, various mechanisms must be adjusted so that the proper setup for a total taking operation will be automatically made at the end of the first cycle. This must include a means to cause the machine to continue operation for the second cycle, a means to change the time of engaging and disengaging the balance totalizer, a means to select and depress the proper one of the two blind new balance totalizer keys in the transaction bank, a means to select the proper side of the balance totalizer by selecting and depressing one of the blind keys in the motor key bank, and a means to bring the machine to rest at the end of the second cycle. The mechanism for accomplishing these various functions will now be explained in detail under appropriate headings.

*Means to prevent restoration of machine release*

This mechanism is shown in Figs. 14, 16 and 18 and includes a helical cam drum 109 rotatable on shaft 110 and having a gear 108 as a part thereof, which gear meshes with teeth on the differential member 105. The helical groove in drum 109 receives a roller 111 mounted on an overturned upper end of an arm 112. This arm has a sleeve portion 270 embracing shaft 113 so that on rotation of the drum 109 the arm 112 may move along shaft 113. The lower end of arm 112 is bifurcated so as to straddle the hub portion 271 of the restoring cam 88, and lies within a groove 272 therein. From Fig. 14 it is evident that when one of the two old balance keys P—OB or N—OB is depressed the differential member 105 will be moved opposite the inner end of the depressed key, causing drum 109 to rotate and shift arm 112 and cam 88 to the left Figs. 16 and 18, so that at the end of the first cycle of the machine the cam 88 will lie out of the path of roller 89a so as to not disengage the machine drive at the end of this cycle.

It might be here stated that during the first cycle of this operation the depressed old balance key is released and one of the new balance keys is depressed so that during the second cycle the member 105 is repositioned so as to lie under the inner end of one of the two blind new balance keys. This causes a rotation of drum 109 to such an extent that the cam 88 is restored to its normal position as shown in Figs. 16 and 18 so that near the end of the second cycle it will be effective to bring the machine to rest.

*Automatic cycle control cams*

In order to automatically actuate certain controls for the automatic cycle mentioned above, a pair of cam disks 65 and 66 (Figs. 11 to 13, and 15 to 18) are provided. These disks are controlled by depression of the old balance keys and are operated by the machine drive. The specific functions performed by these disks will be given in detail under appropriate headings, but first the specific manner in which they are controlled and driven will be explained. These two disks (Figs. 12, 13 and 17) are loosely mounted on shaft 60 and have their hub portions connected by a tongue 273 (Fig. 17) so as to always move in unison. A wide gear 67 (Figs. 12, 15, 16 and 17) is secured to this assembly, and meshes with a gear 68 (Figs. 11, 12 and 16) connected by a sleeve 69 (Figs. 11 and 16) to a gear 70 meshing with a gear 71 secured to the main drive shaft 28. By this train of gears the disks 65 and 66 receive one complete rotation during each machine cycle. As best shown in Fig. 17 disk 66 has an elongated hub portion on which is formed a disk 74, the left side thereof contacting a roller 75a on an arm 75 (see also Figs. 10 and 15) slidable on shaft 30 and bifurcated at its rear end to straddle a rod 274. A short sleeve 275 (Fig. 17) is provided on the arm 75 to aid the sliding movement of this arm on shaft 30. A cam segment 76 (Figs. 10 and 17) is pivoted on shaft 60 and contacts roller 75a. A spring 73 (Fig. 17) presses against the disk assembly and against a thrust collar 72 having a ball race in one side thereof bearing against the hub of a pinion secured to the shaft. Spring 73 causes the disk assembly to be under constant pressure to the left (Fig. 17) so that the disk 74 and roller 75a are held constantly against the cam surface of segment 76, which in turn is held against movement to the left by collar 77 pinned to the shaft. From Fig. 17 it is apparent that a rotary movement of segment 76 will cause a movement of roller 75a and the disk assembly to the right against the pressure of spring 73. It will be noted that movement to the right or left does not effect the rotary operation of the disk assembly, since the wide gear 67 meshes with its driving gear 68 in either lateral position.

Segment 76 is rotated directly by depression of one of the old balance keys, as shown in Figs. 10, 14, 15 and 16. Referring to Figs. 14 and 15, depresion of one of these keys moves the detent slide 84 and its link 82 downward, and through bell crank 80 moves link 79 rearward in the machine and thereby rotates a yoke 78, supported on shaft 60, counter-clockwise (Figs. 10 and 15) to rotate segment 76 correspondingly and thereby shift the roller 75a and disk assembly to the right (Fig. 16).

When the disk assembly is so shifted a bell crank 90 (Fig. 12), pivoted on shaft 34 and spring pressed counter-clockwise, falls into a groove 66b (Figs. 16 and 17) in the hub portion of disk 66, to restrain the disk assembly in its right hand position against the compression of spring 73. This occurs of course before the machine starts its operation. The disk assembly remains in this right hand position until near the end of the second cycle, when the lever 90 is released, in a manner explained hereafter, to allow spring 73 to return it to its normal position. At that time it will be free to return, since the depressed old balance key will have been released at the end of the first cycle, allowing the cam segment 76 and the train of connections between it and the slide 84 to be returned at the same time by the usual return spring similar to spring 276 shown connected to slide 122 in Fig. 14.

The cam disk 65 (Fig. 12) carries a concentric groove 65a and a short connecting cam groove 65d, while the cam disk 66 (Fig. 13) carrries two concentric grooves 66a and 66c connected by a cam groove 66d. A pitman 64 is pivoted to an arm 63 secured to a yoke 92 journaled on shaft 28, and is bifurcated at its rear end to straddle shaft 34. This pitman carries a stud extending from both sides thereof, on which is mounted two rollers 64a and 64b (Figs. 12 and 13) respectively. As better shown in Fig. 17 when the disk assembly is in its normal position roller 64a engages the concentric groove 65a so that during adding operations of the machine the pitman 64 receives no movement whatever. During the two cycle operation, however, when the disk assembly is moved to the right, disk 66 is moved into engagement with roller 64b. Now, referring to Fig. 13, upon operation of the machine, pitman 64 remains in its normal position during the greater part of the first cycle, that is, while the old balance is being entered, but when the cycle is nearly completed the cam portion 66d moves the pitman to the right causing a clockwise rotation of arm 63 and yoke 92.

*Changing the timing for engagement and disengagement of the balance totalizer*

After the old balance is entered during the first cycle, the timing of the engaging mechanism for the balance totalizer must be changed so that the total may be taken therefrom during the second cycle. This means that the totalizer must be engaged at the very beginning of the second cycle and disengaged after the actuators have received their initial movement. To accomplish this the drum 62 (Figs. 11, 16 and 17) for shifting the timing mechanism, in the manner above explained, is connected by a sleeve 277 to the arm 63. Now, when the pitman 64 is moved to the right (Fig. 13) near the end of the first cycle the drum 62 will rotate and shift the timing mechanism for the second cycle.

*Depression of positive or negative new balance key selected by overdraft mechanism*

After the old balance is entered during the first cycle it is also necessary to depress one of the blind new balance totalizer keys in the transaction bank so that the amount taken from the balance totalizer during the second cycle will be reaccumulated. Referring to Figs. 12 and 15 an arm 278 is secured to yoke 92, and is connected through link 93a, lever 93b pivoted at 197, and link 93c, to a bell crank 94. The upper arm of bell crank 94 carries a stud 96 lying in the plane of levers 98 and 99. From these connections it is apparent that when pitman 64 receives its movement to the right during the very last part of the first cycle, bell crank 94 will be rotated clockwise about its pivot 95, and thereby cause the depression of one of the new balance keys. The particular one of these keys that will be depressed depends upon the positive or negative condition of the balance totalizer at the completion of the entry of the old balance, through the selection made by the overdraft mechanism above explained.

The selection of the proper side of the balance totalizer for taking the new balance, as explained above, depends upon which one of the keys in the transaction bank is depressed. This, it will be recalled, is accomplished by the stud 100 or 101 on the depressed key camming the detent slide 10 (Figs. 14 and 15) up or down and thereby moving one of the levers 17 or 18 into cooperation with stud 23 on the motor bar, which, upon depression, depresses one of the blind keys 20 or 22 to shift slide 206 and its connections to the balance totalizer, to cause the proper side thereof to be connected with the actuating mechanism for the ensuing operation. When one of the new balance keys is so depressed and lever 17 or 18 connected with the motor bar, the positive side of the balance totalizer will be connected with the actuators if the positive new balance key was depressed, and the negative side of the balance totalizer will be connected with the actuators if the negative new balance key was depressed, upon the subsequent depression of the motor bar that immediately follows.

Referring now to Fig. 11, a bell crank 115 is pivoted at 116, and has a bifurcated upper end embracing the stud 23 on the motor bar. The horizontal arm of the bell crank is connected to a link 117, the lower end of which lies directly behind the yoke 92. When yoke 92 is moved a short distance to the right at the very end of the first cycle, it swings link 117 to the right and causes a stud 117a thereon to be moved in the path of a shoulder 118 secured to the hub of a gear 279 (Figs. 11 and 18) rotatable on shaft 110 and meshing with a gear 280 secured to shaft 27. As above explained shaft 27 receives one complete rotation during each operation of the machine, and, referring to Fig. 19, since this shaft begins to rotate at the beginning of the second cycle, shoulder 118 will at once depress link 117 and thereby pull the motor bar in. Continued rotation of gear 279 causes shoulder 118 to move out of the path of stud 117a, but since the motor key has been fully depressed and the machine started on its second cycle, it remains in that position as in a normal adding operation, by the customary locking detent.

It might be here stated that toward the end of the first cycle of operation the motor key was released from its original depression when the key release shaft 81 was operated, and that the slide 35, link 36 and lever 37 returned to their upper positions through the tension of a detent spring similar to 276 (Fig. 14). The return of these elements of course was not accompanied by a corresponding return movement of lever 39 (Fig. 10), since the block 40a was not moved from under the shoulder 259 at the end of the first cycle. The return movement of the parts 35, 36 and 37 was, instead, accompanied by a tensioning of spring 38.

With the depression of the motor key at the beginning of the second cycle, the machine is completely conditioned for taking the new balance and, since one of the blind new balance keys P—NB and N—NB are depressed, for transferring it to an appropriate totalizer.

*Restoration of parts at the end of the second cycle*

As heretofore explained, the disk assembly 65—66 is returned to normal position during the latter part of the second cycle. This is accomplished in the following manner:

Depression of one of the new balance keys at the end of the first cycle caused an upward movement of the slide 122 (Figs. 14 and 15), and a corresponding upward movement of links 123 and 124 connected thereto. The forward end of link 124 is slotted, so that an upward movement thereof causes it to embrace a stud 127a on the lower end of an arm 127 secured to the release shaft 81. Now during the latter part of the second cycle, after all calculation is completed, the release shaft 81 is again operated, and moves link 124 to the right (Figs. 12 and 15). Since this link is connected at its rear end to an arm 125 secured to shaft 56, this movement of the link will cause shaft 56 to be rotated counter-clockwise and to carry with it arm 126 also secured thereto. Since the lever 90 is at this time lying in groove 66b (Fig. 17), the roller 90a (Fig. 12) on the lower arm thereof lies against arm 126, so that the counter-clockwise movement of this arm raises the forward end of lever 90 out of the groove and allows the disk assembly to snap to the left under the tension of spring 73. This movement of the disk assembly causes groove 65d in disk 65 to be moved into engagement with roller 64a so that during the remainder of the rotation of the disk assembly pitman 64 is cammed to its original position shown in Fig. 12.

The return of pitman 64 causes the bell crank 94 to assume its normal position and thereby allow spring 199 and levers 98 or 99 to return the depressed new balance key. The return of pitman 64 also causes a return movement of drum 62 (Figs. 11, 16 and 17) to restore the timing mechanism for the engagement of the balance totalizer to normal or adding position.

As already mentioned, the differential mechanism in the transaction bank (Fig. 14) shifted cam 88 back to its original position in line with roller 89a, so that at the end of the second cycle it effects a rotation of release shaft 42 to remove block 40a from under shoulder 259 and arm 46 away from pawl 47, and to place the arm 44 in the path of block 260 to stop the machine. When the block 40a is moved from under the shoulder 30a, spring 38 becomes effective to move lever 39 to the position shown in Fig. 10 where it holds release shaft 42 in its idle position as cam 88 (Fig. 14) moves away from roller 89a at the very end of the operation. It will be noted that spring 38 (Fig. 10) was tensioned to allow this rotation of lever 39 when the slide 35 and lever 36 returned to normal position following a release of the motor key, when the key release shaft 81 operated during the second cycle.

OPERATION.—*Adding*

For an adding operation, that is, for the entry of a deposit or withdrawal, the appropriate amount keys are depressed, together with the D or W key, and then the motor bar 24. Depression of the D or W key moves the slide 10 (Fig. 15) up or down to engage either lever 17 or 18 (Fig. 11) with one of the blind keys in the motor key bank, so that upon depression of the motor key, slide 206 (Fig. 10) will be moved up or down to select the proper side of the balance totalizer. Depression of the motor bar lowers slide 35 and releases the machine by removing shoulder 259 from block 40a. Since the timing mechanism for engaging the balance totalizer (Fig. 11) is at this time in normal or adding position the balance totalizer will be engaged when the amount differentials have completed their initial movement, and will be disengaged when they have completed their return movement. During this operation the automatic cycle cams perform no function since roller 64a (Fig. 12) lies in the concentric groove 65a during the entire operation. Near the end of the cycle, cam 88 (Fig. 14) engages roller 89a and rotates arm 89 to rotate release shaft 42, and remove block 40a (Fig. 10) from under shoulder 259 to allow the shoulder to fall back to its normal position.

OPERATION.—*Entry of old balance, taking new balance, and transfer of new balance to another totalizer*

After the operator has completed the entry of the various deposits and withdrawals he enters the old balance by depressing the appropriate amount keys together with the proper old balance key and the motor bar.

Figure 13:
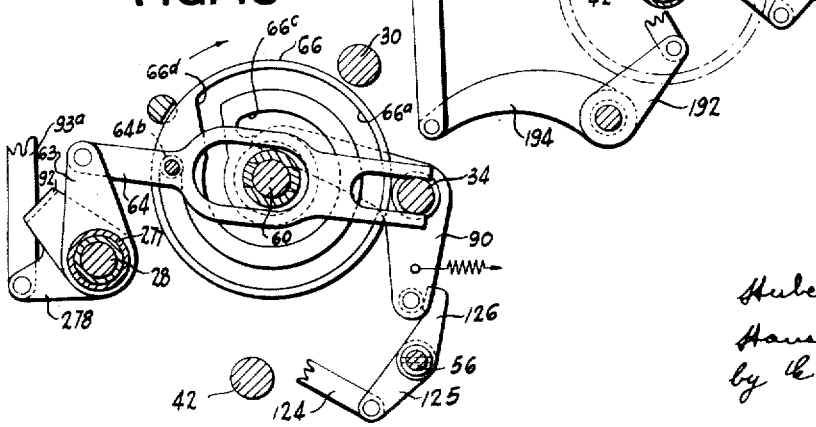
Fig. 13 is a side view showing in detail some of the parts shown in Fig. 12.

Depression of the old balance key moves slide 10 (Fig. 15) up or down to cause the proper side of the balance totalizer to be engaged for the entry of the old balance, as in a normal adding operation. Depression of this key also moves slide 84 down, and thereby rotates segment 76 to move the disk assembly of the automatic cycle mechanism to the right (Figs. 15 and 17). This engages disk 66 with roller 64b (Fig. 13). Now upon operation of the machine the old balance is added in the balance totalizer as in normal adding operations, but since the segment 105 (Fig. 14) is situated in line with one of the old balance keys the drum 109 has shifted cam 88 so that the release shaft 42 is not restored at the end of the cycle. During the latter part of this first cycle the key release shaft 81 operates in the usual manner to release the depressed keys.

Near the end of the first cycle of operation the cam groove 66d (Fig. 13) moves pitman 64 to the right to shift the timing mechanism for engaging the balance totalizer by rotation of drum 62 (Figs. 11, 15 and 17). Movement of the pitman 64 also raises link 93a (Fig. 12) to depress whichever one of the new balance keys is at this time engaged with the stud 96, the selective engagement of these keys depending upon the overdraft mechanism (Fig. 9) of the balance totalizer. This depression of one of the new balance keys moves slide 10 (Fig. 15) up or down so as to have the proper side of the balance totalizer engaged for the second cycle. Movement of the pitman 64 also moves stud 117a (Fig. 11) into the path of shoulder 118 so that the motor bar may be automatically depressed at the very beginning of the second cycle. This second depression of the motor bar controls the engagement of the proper side of the balance totalizer through the slide 206 as in normal adding operations.

During the first part of the second cycle the new balance is taken from the balance totalizer by the initial movement of the differential mechanism, and during the last part of this cycle the cleared amount is entered on the totalizer selected by the depressed new balance key in the transaction bank, this entering taking place during the return movement of the amount differentials, as is customary in the art. The new balance transaction totalizer (Figs. 20 and 21) is engaged and disengaged with the actuators at the proper time to receive this amount, since the timing mechanism for this totalizer is controlled by the lever 141 (Fig. 17) which remains in its adding position during this entire operation.

Depression of one of the new balance keys raises slide 122 (Figs. 14 and 15) to couple link 124 with lever 127 so that upon operation of the key release shaft 81, lever 90 (Fig. 12) is oscillated to allow the automatic cycle disk assembly to return to its left hand position (Fig. 17) where cam groove 65d (Fig. 12) engages roller 64a to return pitman 64 to its left hand position during the remainder of the operation of the machine. This shifting of pitman 64 returns the timing mechanism for the balance totalizer to its adding position and allows the depressed new balance key to return from its depressed position. The return of the pitman also allows stud 117a (Fig. 11) to return to its normal position.

During the second cycle the segment 105 (Fig. 14) is moved from its position opposite an old balance key to a position opposite one of the new balance keys. This rotates drum 109 to replace cam 88 in the plane of roller 89a to stop the machine at the end of this cycle.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:

1. In a machine of the class described having a main operating mechanism, in combination with an add and subtract totalizer having a positive and a negative side, means including differential mechanisms to enter positive and negative items into the totalizer and to take balances therefrom; settable means which when set in one position determines the selection of the positive side of the totalizer and when set in another position determines the selection of the negative side of the totalizer; a plurality of control devices to position the settable means for the entry of positive or negative amounts into the totalizer and to take balances therefrom; means to arrest the main operating mechanism at the end of certain amount entry operations; and a mode of operation control means adjustable into one position for controlling the first-named means for entering amounts into the totalizer and adjustable into another position for controlling the first-named means for balance operations; of means positioned under control of certain of said control devices to render the arresting means ineffective at the end of amount entering operations; and a normally ineffective means, rendered effective by said certain control devices, to automatically adjust the mode of operation control means into the balance operation position to automatically take a balance from the totalizer immediately following said certain amount entering operation.

2. In a machine of the class described having a main operating mechanism, in combination with an add and subtract totalizer having a positive and a negative side, means including differential mechanisms to enter positive and negative items into the totalizer and to take balances therefrom; settable means which when set in one position determines the selection of the positive side of the totalizer and when set in another position determines the selection of the negative side of the totalizer; a plurality of control devices to position the settable means for the entry of positive or negative amounts into the totalizer and to take balances therefrom; means to arrest the main operating mechanism at the end of certain amount entry operations; and a mode of operation control means adjustable into one position for controlling the first-named means for entering amounts into the totalizer and adjustable into another position for controlling the first-named means for balance operations; of means positioned under control of certain of said control devices to render the arresting means ineffective at the end of certain amount entering operations; a normally ineffective cam means; connections between said certain control devices and the cam means to render the cam means effective; and means operated by the cam means to position the mode of operation means into the balance operation position to cause a balance operation to be taken immediately following said certain amount entering operation.

3. In a machine of the class described having a main operating mechanism, in combination with an add and subtract totalizer having a positive and a negative side, means including differential mechanisms to enter positive and negative items into the totalizer and to take balances therefrom, settable means which when set in one position determines the selection of the positive side of the totalizer and when set in another position determines the selection of the negative side of the totalizer, a plurality of control devices to position the settable means for the entry of positive or negative amounts into the totalizer and to take balances therefrom; means to arrest the main operating mechanism at the end of certain amount entry operations; and a mode of operation control means adjustable into one position for controlling the first-named means for entering amounts into the totalizer and adjustable into another position for controlling the first-named means for balance operations; of means positioned under control of certain of said control devices to render the arresting means ineffective at the end of amount entering operations; a cam operable during each machine operation; connections between the cam and the mode of operation control means said connections being normally disconnected from the cam; and means operated by certain of the control devices to couple the cam to the connections so that the cam and connections adjust the mode of operation control means to the balance control position to cause a balance to be taken from the totalizer in an operation immediately following said certain amount entering operation.

4. In a machine of the class described having a main operating mechanism, in combination with an add and subtract totalizer having a positive and a negative side, means including differential mechanisms to enter positive and negative items into the totalizer and to take balances therefrom, settable means which when in one position determines the selection of the positive side of the totalizer and when in another position determines the selection of the negative side of the totalizer, a plurality of control devices to position the settable means for the entry of positive or negative amounts into the totalizer and to take balances therefrom, means to arrest the main operating mechanism at the end of certain amount entry operations, and a mode of operation control means adjustable into one position for controlling the first-named means for entering amounts into the totalizer and into another position for controlling the first-named means for balance operations; of means positioned under control of certain of said control devices to render the arresting means ineffective at the end of certain amount entering operations; a normally ineffective cam means; connections between said certain control devices and the cam means to render the cam means effective; and means operated by the cam means including mechanism to operate a selected one of the control devices at the end of one cycle of operation to selectively position the settable means for the next cycle of operation and mechanism to automatically position the mode of operation control means into the balance operation position to cause a balance to be taken in an operation immediately following said certain amount entering operation.

5. In a machine of the class described having a main operating mechanism, in combination with an add and subtract totalizer having a positive and a negative side, means including differential mechanisms to enter positive and negative items into the totalizer and to take balances therefrom, settable means which when in one position determines the selection of the positive side of the totalizer and when in another position determines the selection of the negative side of the totalizer, a plurality of control devices to position the settable means for the entry of positive or negative amounts into the totalizer and to take balances therefrom, a manipulative device, means operated by the manipulative device to select the positive or negative side of the totalizer as determined by the position of the settable means, means to arrest the main operating mechanism at the end of certain amount entering operations, and a mode of operation control means which when in normal position controls the first-named means for amount entering operations and adjustable into a position to control said first-named means for balance operations; of means positioned under control of certain of the control devices to render the arresting means ineffective at the end of certain amount entering operations, normally ineffective means rendered effective by certain of said control devices, and means operated by the last-named means when effective, including mechanism to automatically operate a selected one of said control devices at the end of one machine operation to selectively position the settable means, mechanism to automatically operate the manipulative device and mechanism to automatically position the mode of operation control means into the balance operation position to cause a balance to be taken from the totalizer in an operation immediately following said certain amount entering operation.

6. In a machine of the class described having a main operating mechanism, in combination with an add and subtract totalizer having a positive and a negative side, means including differential mechanisms to enter positive and negative items into the totalizer and to take balances therefrom, settable means which when in one position determines the selection of the positive side of the totalizer and when in another position determines the selection of the negative side of the totalizer, a plurality of control devices to position the settable means for the entry of positive or negative amounts into the totalizer and to take balances therefrom, a manipulative device, means operated by the manipulative device to select the positive or negative side of the totalizer as determined by the position of the settable means, means to arrest the main operating mechanism at the end of certain amount entry operations, and a mode of operation control means which when in normal position controls the first-named means for amount entering operations and adjustable into a position to control said first-named means for balance operations; of means positioned under control of certain of the control devices to render the arresting means ineffective at the end of certain amount entering operations; a cam normally in an ineffective position but operated during each machine operation, means operated by one of the control devices to shift the cam from said ineffective position into an effective position, and means operated by the cam when the cam is in the effective position to operate the mode of operation control means at the end of one cycle of operation of the machine to cause a balance to be automatically taken immediately following an amount entering operation.

7. In a machine of the class described having a main operating mechanism, in combination with an add and subtract totalizer having a positive and a negative side, means including differential mechanisms to enter positive and negative items into the totalizer and to take balances therefrom, settable means which when in one position determines the selection of the positive side of the totalizer and when in another position determines the selection of the negative side of the totalizer, a plurality of control devices to position the settable means for the entry of positive or negative amounts into the totalizer and to take balances therefrom, a manipulative device, means operated by the manipulative device to select the positive or negative side of the totalizer as determined by the position of the settable means, means to arrest the main operating mechanism at the end of certain amount entry operations, and a mode of operation control means which when in normal position controls the first-named means for amount entering operations and adjustable into a position to control said first-named means for balance operations; of means positioned under control of certain of the control devices to render the arresting means ineffective at the end of certain amount entering operations; a cam normally in an ineffective position but operated during each machine operation, means operated by one of the control devices to shift the cam from said ineffective position into an effective position, means operated by the cam when the cam is in the effective position to operate the mode of operation control means at the end of one cycle of operation of the machine to cause a balance to be automatically taken immediately following an amount entering operation, and means actuated by the last-named means to operate the manipulative device prior to the balance taking cycle of operation.

8. In a machine of the class described having a main operating mechanism, in combination with an accumulator, differential means to enter amounts into the accumulator and to take totals therefrom, adjustable means to couple the accumulator and differential means in one timing during entry operations and in another timing during total taking operations, movable means to adjust the last named means to one position when entering items and to another position when taking totals, and a motor key operable to release the machine for operation; of a manipulative device; a power operated means normally ineffective to operate the movable means; connections between the power operated means and the manipulative device and operated by the manipulative device, when the manipulative device is operated to enter old balances into the machine, to render the power operated means effective; connections between the power operated means and the movable means to automatically move the movable means to adjust the adjustable means, from the position in which the adjustable means couples the accumulator with the differential for entering the old balance into the accumulator, into the position in which the adjustable means couples the accumulator with the differential to take a total from the accumulator; means to normally arrest the main operating mechanism at the end of the old balance entering operation; and means rendered effective by the manipulative device to prevent the arresting means from becoming effective at the end of the old balance entering operation to automatically cause said total to be taken in an operation immediately following said entry operation without interrupting the operation of the machine.

9. In a machine of the class described, in combination with an accumulator, differential means for entering items into the accumulator and taking totals therefrom, adjustable means to couple the totalizer with the actuator, said means normally being in a position to couple the accumulator and the differential means in item entry timing and adjustable into a position to couple the accumulator and the dfferential means in total taking timing, a plurality of control keys, including a deposit key, a withdrawal key, and an old balance key operable to prepare the machine to enter items into the accumulator, a moving means to shift the adjustable means from normal item entry timing position into total taking timing position, and a motor key operable to release the machine for operation; of a power operated means normally ineffective to operate the movable means, connections between the power operated means and the old balance key, said connections operable, when the old balance key is depressed, to render the power operated means effective, connections between the power operated means and the moving means to automatically operate the moving means to adjust the adjustable means from the normal item entry position into total taking position, means rendered effective by the power operated means to operate the motor key at the end of an old balance entry operation, and means adjusted under control of the old balance key to cause the total to be taken from the accumulator in an operation immediately following said old balance entry operation, said old balance entry operation and the said total taking operation being performed in two uninterrupted cycles of operation of the machine.

10. In a machine of the class described having a main operating mechanism, in combination with an add and subtract totalizer having a positive and a negative side, means including differential means to enter positive or negative items therein and to take positive or negative balances herefrom, selecting means to select the positive or negative side of the totalizer for item entering operations and for taking positive or negative balances, a plurality of manipulative devices to control the selecting means, and a motor key to release the machine for operation; of a normally ineffective cam operable one complete rotation during each operation of the machine, connections operated by certain of said manipulative devices when operated for item entering operations to render the cam effective, means operated by the cam to operate certain of said manipulative devices to select the positive or negative side of the balance totalizer and to simultaneously condition certain elements of the machine for taking a balance from the totalizer, means to arrest the main operating mechanism at the end of a single cycle of operation, and means settable under control of said certain manipulative devices to render the arresting means ineffective near the end of one cycle of operation to cause a second cycle of operation to be performed without interrupting the operation of the machine to take a balance from the selected side of the totalizer.

11. In a machine of the class described having a main operating mechanism, in combination with an add and subtract totalizer having adding and subtracting wheels, actuators to enter positive and negative amounts into the totalizer and to take balances therefrom, a "fugitive one" mechanism, a settable means movable to one position by the "fugitive one" mechanism when the balance is positive and to another position when the balance is negative, a plurality of control devices, means operable by certain of said control devices to determine the selection of the adding or subtracting wheels for entering an amount, means operable by other of said control devices to determine the selection of the adding and subtracting wheels for taking balances, and means to normally arrest the main operating mechanism at the end of one cycle of operation; of a normally ineffective power operated means, connections between the power operated means and the said certain control devices to render the power operated means effective; means operated by the power operated means to operate the one of said other of the control devices which is selected by the settable means, and means differentially positioned under control of said control devices to render the arresting means ineffective at the end of one cycle of operation to cause a balance to be taken from the selected wheels during an operation immediately following the amount entering operation.

HUBERT NEUREITER.
HANS SCHWENK.

CERTIFICATE OF CORRECTION.

Patent No. 2,176,146.           October 17, 1939.

HUBERT NEUREITER, ET AL.

It is hereby certified that error appears in the above numbered patent requiring correction as follows: In the heading to the drawings, Sheets 1 to 15 inclusive, name of inventor, for "H. NEUEITER ET AL" read H. NEUREITER ET AL; page 3, second column, line 3, after the word "by" insert exceeding; page 5, first column, line 4, for "plate 30" read plate 300; page 9, second column, line 60-61, for "shoulder 30a" read shoulder 39a; page 12, second column, line 58, claim 9, for "adjost" read adjust; and that the said Letters Patent should be read with this correction therein that the same may conform to the record of the case in the Patent Office.

Signed and sealed this 5th day of December, A. D. 1939.

(Seal)

Henry Van Arsdale,
Acting Commissioner of Patents.

therein and to take positive or negative balances herefrom, selecting means to select the positive or negative side of the totalizer for item entering operations and for taking positive or negative balances, a plurality of manipulative devices to control the selecting means, and a motor key to release the machine for operation; of a normally ineffective cam operable one complete rotation during each operation of the machine, connections operated by certain of said manipulative devices when operated for item entering operations to render the cam effective, means operated by the cam to operate certain of said manipulative devices to select the positive or negative side of the balance totalizer and to simultaneously condition certain elements of the machine for taking a balance from the totalizer, means to arrest the main operating mechanism at the end of a single cycle of operation, and means settable under control of said certain manipulative devices to render the arresting means ineffective near the end of one cycle of operation to cause a second cycle of operation to be performed without interrupting the operation of the machine to take a balance from the selected side of the totalizer.

11. In a machine of the class described having a main operating mechanism, in combination with an add and subtract totalizer having adding and subtracting wheels, actuators to enter positive and negative amounts into the totalizer and to take balances therefrom, a "fugitive one" mechanism, a settable means movable to one position by the "fugitive one" mechanism when the balance is positive and to another position when the balance is negative, a plurality of control devices, means operable by certain of said control devices to determine the selection of the adding or subtracting wheels for entering an amount, means operable by other of said control devices to determine the selection of the adding and subtracting wheels for taking balances, and means to normally arrest the main operating mechanism at the end of one cycle of operation; of a normally ineffective power operated means, connections between the power operated means and the said certain control devices to render the power operated means effective; means operated by the power operated means to operate the one of said other of the control devices which is selected by the settable means, and means differentially positioned under control of said control devices to render the arresting means ineffective at the end of one cycle of operation to cause a balance to be taken from the selected wheels during an operation immediately following the amount entering operation.

HUBERT NEUREITER.
HANS SCHWENK.

CERTIFICATE OF CORRECTION.

Patent No. 2,176,146. October 17, 1939.

HUBERT NEUREITER, ET AL.

It is hereby certified that error appears in the above numbered patent requiring correction as follows: In the heading to the drawings, Sheets 1 to 15 inclusive, name of inventor, for "H. NEUEITER ET AL" read H. NEUREITER ET AL; page 3, second column, line 3, after the word "by" insert exceeding; page 5, first column, line 4, for "plate 30" read plate 300; page 9, second column, line 60-61, for "shoulder 30a" read shoulder 39a; page 12, second column, line 58, claim 9, for "adjost" read adjust; and that the said Letters Patent should be read with this correction therein that the same may conform to the record of the case in the Patent Office.

Signed and sealed this 5th day of December, A. D. 1939.

Henry Van Arsdale,
Acting Commissioner of Patents.

(Seal)